United States Patent [19]
Ito

[11] Patent Number: 5,629,477
[45] Date of Patent: May 13, 1997

[54] TESTING APPARATUS FOR FUEL VAPOR TREATING DEVICE

[75] Inventor: Tokiji Ito, Toyota, Japan

[73] Assignee: Toyota Jidosha Kabushiki Kaisha, Toyota, Japan

[21] Appl. No.: 688,460

[22] Filed: Jul. 30, 1996

[30] Foreign Application Priority Data

Jul. 31, 1995 [JP] Japan ................... 7-195161

[51] Int. Cl.⁶ ............... F02M 25/08; F02D 41/22; G01M 15/00
[52] U.S. Cl. ............... 73/118.1; 73/49.7; 123/518; 123/520; 364/431.052
[58] Field of Search ............... 73/49.7, 116, 117.2, 73/117.3, 118.1; 123/518, 519, 520; 364/431.05, 431.06

[56] References Cited

U.S. PATENT DOCUMENTS

| | | | |
|---|---|---|---|
| 5,143,035 | 9/1992 | Kayanuma | 123/520 |
| 5,158,054 | 10/1992 | Otsuka | 123/520 |
| 5,245,973 | 9/1993 | Otsuka et al. | 123/518 |
| 5,253,629 | 10/1993 | Fornuto et al. | 123/519 |
| 5,295,472 | 3/1994 | Otsuka et al. | 123/520 |
| 5,315,980 | 5/1994 | Otsuka et al. | 123/520 |
| 5,333,589 | 8/1994 | Otsuka | 123/520 |
| 5,425,344 | 6/1995 | Otsuka et al. | 123/520 |
| 5,437,256 | 8/1995 | Woletz et al. | 123/519 |
| 5,443,051 | 8/1995 | Otsuka | 123/520 |
| 5,495,749 | 3/1996 | Dawson et al. | 73/118.1 |

FOREIGN PATENT DOCUMENTS 6-117334  4/1994  Japan.

*Primary Examiner*—George M. Dombroske
*Attorney, Agent, or Firm*—Kenyon & Kenyon

[57] ABSTRACT

A fuel vapor treating device that collects fuel vapor produced in a fuel tank and treats the vapor without releasing it into the atmosphere. The treating device is provided with a canister that collects the fuel vapor through a vapor line. A vapor control valve provided in the canister adjusts the flow of fuel vapor directed toward the canister from the tank. A purge line connects the canister to an intake passage of an engine. The fuel collected in the canister is purged into the intake passage through the purge line. A purge control valve provided in the purge line adjusts the flow rate of the fuel flowing through the purge line. A three-way valve selectively switches the section which the pressure sensor is connected to between the tank side and the canister side. An electronic control unit (ECU) controls the purge control valve and the three-way valve. The ECU performs testing of the sealing of the tank side and the canister side based on the tank pressure and the canister pressure, which are detected by the pressure sensor. When the purge control valve should be opened causing the fuel in the canister to be purged into the intake passage, the ECU determines that the purge control valve is closed and malfunctioning if the canister pressure is positive with respect to a predetermined reference value and is free from pulsation.

19 Claims, 17 Drawing Sheets

TESTING APPARATUS FOR FUEL VAPOR TREATING DEVICE

BACKGROUND OF THE INVENTION

1. Field of the Invention

The present invention relates generally to an device for collecting and treating vaporized fuel in a fuel tank without releasing the fuel vapor into the atmosphere. More particularly, the present invention pertains to a testing apparatus that tests for malfunctions concerning the sealing of a fuel vapor treating device, which is provided with a canister for collection of fuel and a purging means for appropriate purging of the fuel into an intake passage of an engine.

2. Description of the Related Art

A fuel vapor treating device typically mounted on a vehicle, collects and treats vaporized fuel in a fuel tank without releasing the fuel vapor into the atmosphere. As shown in FIG. 17, a typical apparatus has a canister 73 that draws in and collects fuel vaporized in a fuel tank 71 through a vapor line 72. The canister 73 is filled with an adsorbent 74 comprised of activated carbon or the like. A purge line 75, extending from the canister 73, is connected to an intake passage 77 of an engine 76. The canister 73 first adsorbs the vaporized fuel drawn in through the vapor line 72. The canister 73 collects fuel and discharges only the residual gas, from which fuel components (particularly hydrocarbon, HC) have been extracted, into the atmosphere through a hole 78. The fuel collected in the canister 73 is purged into the intake passage 77 by way of the purge line 75 during operation of the engine 76. A purge control valve 79, provided in the purge line 75, adjusts the flow rate of the fuel conveyed through the purge line 75 in accordance with the requirements of the engine 76.

In this typical treating device damage or disconnection of the vapor line 72 may lead to a degradation in the airtightness, or sealing, of the treating device. This may result in insufficient treatment of the vaporized fuel.

Japanese Unexamined Patent Publication 6-108930 describes an apparatus that tests for malfunctions such as those described above. As shown in FIG. 18, a testing apparatus used for fuel vapor treating devices includes a fuel tank 81, a canister 82, a vapor line 83, and a purge line 84. A purge vacuum switching valve (VSV), or purge control valve 85, provided in the purge line 84, adjusts the flow rate of the fuel passing through the purge line 84. An electronic control unit (ECU) 86 controls the purge control valve 85 during operation of the engine 76. A vapor control valve 87, provided in the vapor line 83, controls the flow of vaporized fuel directed toward the canister 82 from the fuel tank 81. A difference in pressure between the fuel tank 81 side and the canister 82 side of the vapor control valve 87 opens the valve 87 and causes the vaporized fuel to flow therethrough toward the canister 82. The testing apparatus includes a pressure sensor 88 which separately detects the interior pressure in the tank side of the vapor control valve 87 and the canister side of the vapor control valve 87. That is, a three-way valve 89, connected to the pressure sensor 88, includes a port connected to the vapor line 83 at the side of the fuel tank 81 and another port connected to the vapor line 83 at the side of the canister 82. The pressure sensor 88 selectively detects the tank pressure and the canister pressure when the ECU 86 switches the side which the three-way valve 89 is connected to in accordance with its requirements. The ECU 86 determines whether there is a malfunction in either the tank side or the canister side based on the detected value of the tank pressure and the canister pressure.

However, accurate detection of the interior pressure in the canister side is obstructed in the testing apparatus described in the above publication when a malfunction occurs in the purge control valve 85. For example, when a valve body of the control valve 85 adheres to a casing or other parts in a closed state, the interior pressure of the canister side may be detected inaccurately since the pressure is detected under the assumption that the valve body is opened. Or, for example, when the valve body of the control valve 85 adheres to the casing or other parts in an opened state, the interior pressure of the canister side may be detected inaccurately since the pressure is detected under the assumption that the valve body is closed. Such erroneous detection of the interior pressure in the canister side may hinder appropriate testing concerning the sealing in the canister side that is conducted by the ECU 86.

SUMMARY OF THE INVENTION

Accordingly, it is a primary objective of the present invention to provide a testing apparatus that appropriately performs testing on of a purge control valve to appropriately determine malfunctions related to the sealing of a canister side of a purge control valve, which adjusts the flow rate of fuel passing through the purge line of a fuel vapor treating device.

To achieve the foregoing and other objects and in accordance with the purpose of the present invantion, a testing apparatus for a fuel vapor treating device is provided. The treating device includes a canister for collecting fuel vapor generated in a fuel tank through a vapor line, wherein the fuel in the tank is supplied to an engine. The treating device includes a purge line for purging the collected fuel in the canister into an air intake passage of the engine by a negative intake pressure generated in the intake passage during operation of the engine. The treating device includes a vapor control valve for adjusting a flow of the fuel vapor passing therethrough from the tank to the canister, wherein the vapor control valve opens in accordance with a difference between the pressure of the tank and the pressure of the canister. The treating device includes a purge control valve for adjusting a flow rate of fuel vapor passing through the purge line, wherein the opening of the purge control valve is duty controlled in accordance with a duty signal. The treating device includes control device for controlling the purge control valve during operation of the engine, wherein the control device supplies the duty signal to the purge control valve, and wherein the duty control of the purge control valve causes pulsation of a negative intake pressure applied to the purge line from the air intake passage. The apparatus comprises pressure detecting device for detecting the pressure at a canister side of the vapor control valve. The apparatus comprises first testing device for testing a malfunction related to a sealing of the canister side based on the detected pressure. The apparatus comprises first deciding device for deciding whether the control device is supplying the duty signal to the purge control valve. The apparatus comprises second deciding device for deciding whether the detected pressure is higher than a predetermined reference value. The apparatus comprises third deciding device for deciding whether a pressure pulsation is absent in the detected pressure caused by the duty control of the purge control valve. The apparatus comprises second testing device for determining that there is a malfunction hindering selective opening of the purge control valve, when the first deciding device decides that the control device is supplying the duty signal to the purge control valve and the second deciding device decides that the detected pressure is higher than a predetermined reference value and the third deciding device decides that the pressure pulsation is absent in the detected pressure caused by the duty control of the purge control valve.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

A testing apparatus for a vehicle fuel vapor treating device according to the present invention will hereafter be described with reference to the drawings.

Figure 1:
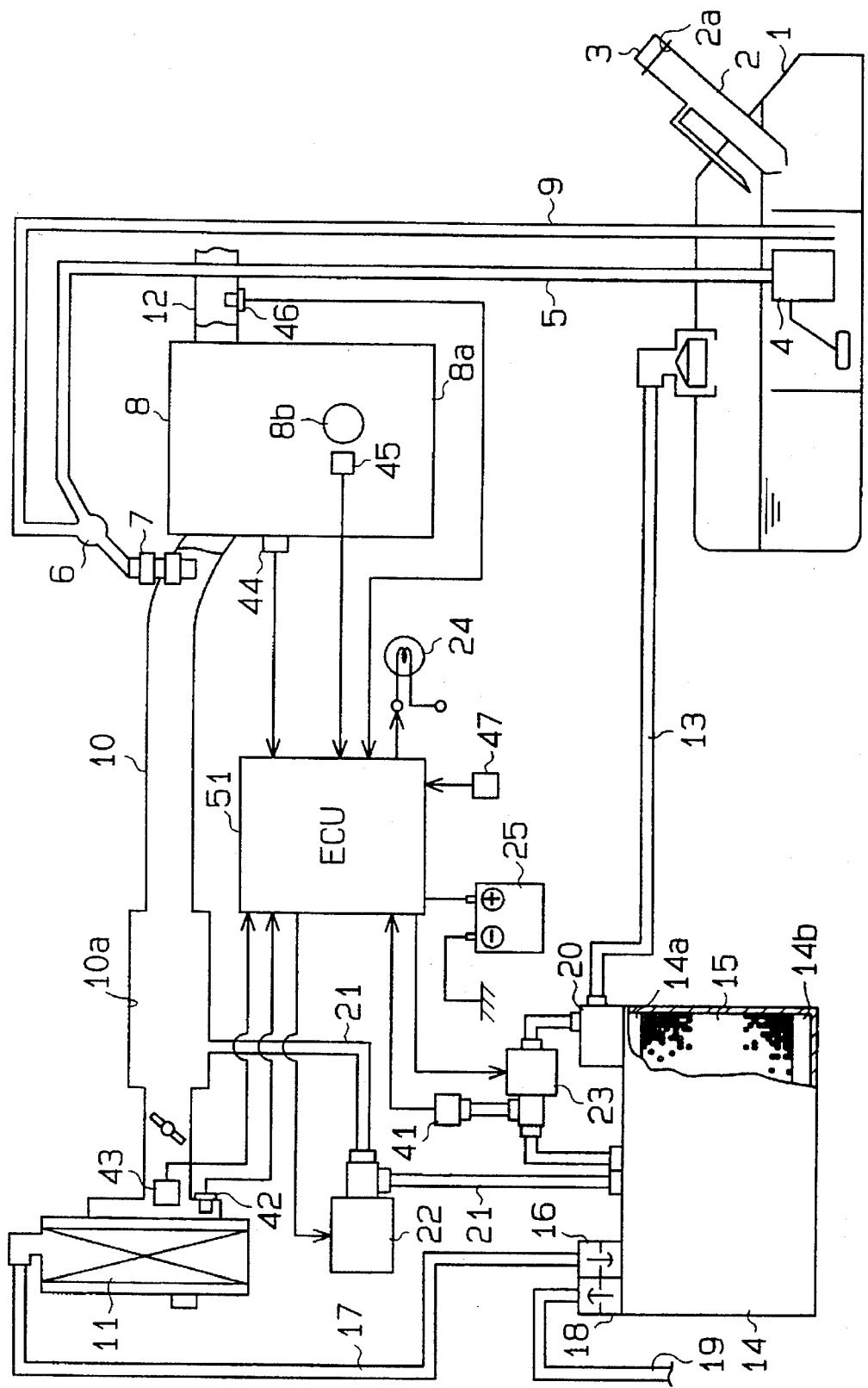
FIG. 1 is a diagrammatic illustration showing a fuel vapor treating device and its testing apparatus.

Referring to FIG. 1, a gasoline engine system of a vehicle has a fuel tank 1 in which fuel is reserved. The tank 1 includes a filler pipe 2 to charge fuel, or refuel the tank 1. The pipe 2 has a filler hole 2a into which a fuel nozzle (not shown) is inserted during refueling of the tank 1. The filler hole 2a is closed by a removable cap 3.

The fuel inside the tank 1 is drawn into a pump 4, incorporated in the tank 1, and discharged therefrom. A main line 5 extending from the pump 4 is connected to a delivery pipe 6. A plurality of injectors 7, provided in the pipe 6, are aligned with cylinders of an engine 8. A return line 9 extending from the pipe 6 is connected to the tank 1. Operation of the pump 4 causes the fuel discharged from the pump 4 to be sent to the delivery pipe 6 via the main line 5. The delivery pipe 6 distributes fuel to each injector 7. As each injector 7 is actuated, the fuel is injected into an intake passage 10. The intake passage 10 includes an air cleaner 11 and a surge tank 10a. Air flows through the air cleaner 11 and is purified when it flows therethrough. The fuel, injected from the injectors 7, is mixed with air and supplied to each cylinder of the engine 8 for combustion. The residual fuel that is not distributed to the injectors 7 is returned to the tank 1 via the return line 9. The exhaust gas produced during combustion is emitted into the atmosphere from the cylinders of the engine 8 through an exhaust passage 12.

The fuel vapor treating device of the preferred embodiment collects and treats vaporized fuel produced in the tank 1 without releasing the fuel into the atmosphere. The fuel vapor treating device has a canister 14 to collect vaporized fuel flowing through the vapor line 13. The canister 14 is filled with an adsorbent 15 comprised of activated carbon or the like. The canister 14 includes an accommodating space, where the adsorbent 15 is accommodated, and opened spaces 14a, 14b, defined above and below the adsorbent 15.

A first control valve 16, which is a check valve, is provided in the canister 14. The control valve 16 opens when the interior pressure of the canister 14 becomes smaller than the atmospheric pressure. When opened, the control valve 16 allows atmospheric air to be drawn into the canister 14 while preventing a flow of gas in the reverse direction. An air pipe 17 extending from the control valve 16 is connected to a position near the air cleaner 11. This structure enables atmospheric air, purified by the air cleaner 11, to be drawn into the canister 14. The canister 14 is also provided with a second control valve 18, which is also a check valve. The control valve 18 opens when the interior pressure of the canister 14 becomes greater than the atmospheric pressure. When opened, the control valve 18 allows gas (internal pressure) to be released from the canister 14 through an outlet pipe 19 while preventing a reversed flow of the gas.

A vapor control valve 20, provided in the canister 14, controls the flow rate of the vaporized fuel, passing therethrough from the tank 1 to the canister 14. The control valve 20 opens in accordance with the difference between the interior pressure PT at the side of the tank 1 including the vapor line 13 (hereafter referred to as tank pressure) and the interior pressure PC at the side of the canister 14 (hereafter referred to as canister pressure). When opened, the control valve 20 allows vaporized fuel to flow into the canister 14 from the tank 1. In other words, the control valve 20 opens and allows vaporized fuel to enter the canister 14 when the value of the canister pressure PC becomes approximately the same as the atmospheric pressure and thus becomes smaller than the tank pressure PT. The control valve 20 also allows gas to flow toward the tank 1 from the canister 14 when the canister pressure PC becomes higher than the tank pressure PT.

A purge line 21, extending from the canister 14, is connected to the surge tank 10a. The canister 14 collects fuel introduced through the vapor line 13 and discharges only the residual gas, from which fuel components have been extracted, into the atmosphere through the outlet pipe 19 when the control valve 18 is opened. When the engine 8 is running, the negative pressure produced in the intake passage 10 acts on the purge line 21. This causes the fuel collected in the canister 14 to be purged into the intake passage 10 through the purge line 21. A purge control valve 22, provided in the purge line 21, adjusts the flow rate of fuel passing through the line 21 when required by the engine 8. The control valve 22 is an electromagnetic valve that includes a casing and a valve body (neither is shown). The valve body is moved by an electric signal (duty signal) to open the control valve 22. The opening of the control valve 22 is duty controlled.

Duty control refers to the controlling of the energized time period based on a duty ratio. The duty ratio is obtained from the ratio of the energized time period with respect to the time period of a single cycle. Furthermore, the average electric current is variably controlled by digitally altering the ratio of the energized time period with respect to the non-energized time period. In this embodiment, duty control particularly refers to intermittent opening of the control valve 22 based on the duty ratio.

The testing apparatus, which performs testing of the sealing of the treating device, includes a pressure sensor 41. The pressure sensor 41 is capable of separately detecting the tank pressure PT and the canister pressure PC. A three-way valve 23 having three ports is provided with the pressure sensor 41. The three-way valve 23 connects a selected two of the three ports together based on electric signals. A first port of the three-way valve 23 is connected to the sensor 41. A second port is connected to the vapor line 13 at the tank 1 side of the control valve 20. A third port is connected to the canister 14. By switching the connected pair of ports of the three-way valve 23 when required, the pressure sensor 41 becomes selectively connected with either the vapor line 13 or the canister 14. The switching enables the pressure sensor 41 to selectively detect either the tank pressure PT or the canister pressure PC. In this embodiment, priority is given to the detection of the tank pressure PT. Thus, the three-way valve 23 is set to be connected to the vapor line 13 in case it cannot be switched by electric signals.

Various sensors 42, 43, 44, 45, 46, 47 detect the running condition of the engine 8 and the vehicle. The intake air temperature sensor 42, which is near the air cleaner 11, detects the temperature of the air drawn into the intake passage 10, or the intake air temperature THA, and transmits a signal based on the detected temperature value. The intake flow rate sensor 43, located near the air cleaner 11, detects the intake flow rate Q of the air drawn into the intake passage 10 and transmits a signal based on the detected flow rate. The coolant temperature sensor 44, provided on the engine 8, detects the temperature of the coolant flowing through an engine block 8a, or the coolant temperature THW, and transmits a signal based on the detected temperature value. The engine speed sensor 45, provided in the engine 8, detects the revolution speed of a crank shaft 8b, or the engine speed NE, and transmits a signal based on the detected speed. The oxygen sensor 46, provided in the exhaust passage 12, detects the oxygen concentration Ox of the exhaust gas passing through the exhaust passage 12 and transmits a signal based on the detected value. The vehicle speed sensor 47, provided in the vehicle, detects the vehicle speed SPD and transmits a signal based on the detected speed.

An electronic control unit (ECU) 51 receives the signals transmitted from the sensors 41–47. The ECU 51 commands the treating device and controls fuel purging. The ECU 51 controls the purge control valve 22 and purges fuel from the canister 14 to the intake passage 10 at a flow rate corresponding to the running condition of the engine 8. That is, the ECU 51 sends a duty signal to the purge control valve 22 that is necessary to control the opening of the valve 22 in correspondence with the required duty ratio DPG.

The fuel purged into the intake passage 10 from the canister 14 influences the air-fuel ratio in the engine 8. The influence on the air-fuel ratio is taken into consideration by the ECU 51 when determining the opening of the purge control valve 22 in accordance with the running condition of the engine 8. Generally, a high air-fuel ratio results in an increase in carbon monoxide (CO) concentration of the exhaust gas from an engine. Thus, the ECU 51 computes the purge concentration FGPG (the purge concentration FGPGI during idling of the engine 8) from the oxygen concentration Ox of the exhaust gas detected by the oxygen sensor 46. Based on the computed value, the ECU 51 determines the duty ratio DPG for the opening of the purge control valve 22, and transmits a duty signal in accordance with the value of the determined duty ratio DPG to the purge control valve 22.

The ECU 51 also commands the testing apparatus. In accordance with the results detected by the sensors 41–47, the ECU 51 switches the connected ports of the three-way valve 23 and selectively reads either the value of the tank pressure PT or the canister pressure PC, which are detected by the pressure sensor 41. The ECU 51 performs tests related to the sealing of the tank side and the sealing of the canister side based on the values of the tank pressure PT and the canister pressure PC.

In other words, when the pressure sensor 41 detects the tank pressure PT, the ECU 51 judges whether or not the detected value matches a predetermined value corresponding to the running condition of the engine 8. When the detected value matches the predetermined value, the ECU 51 determines that the tank side is in a normal state. When the detected value differs from the predetermined value, the ECU 51 determines that the tank side is malfunctioning. In the same manner, when the pressure sensor 41 detects the canister pressure PC, the ECU 51 judges whether or not the detected value matches a predetermined value corresponding to the running condition of the engine 8. When the detected value matches the predetermined value, the ECU 51 determines that the canister side is functioning normally. When the detected value differs from the predetermined value, the ECU 51 determines that there is a malfunction in the canister side.

The ECU 51 performs testing of the purge control valve 22 and the three-way valve 23 based on the values detected by the sensors 41–47. A warning lamp 24, arranged on an instrument panel in front of the driver's seat, informs the driver of the result of the tests performed by the ECU 51. The warning lamp 24 is lit when there is a malfunction in the treating device or the testing apparatus. The lamp 24 remains turned off when the treating device and the testing apparatus are in a normal state. The ECU 51 is energized by a battery 25 and concurrently judges the voltage state of the battery 25.

Figure 2:
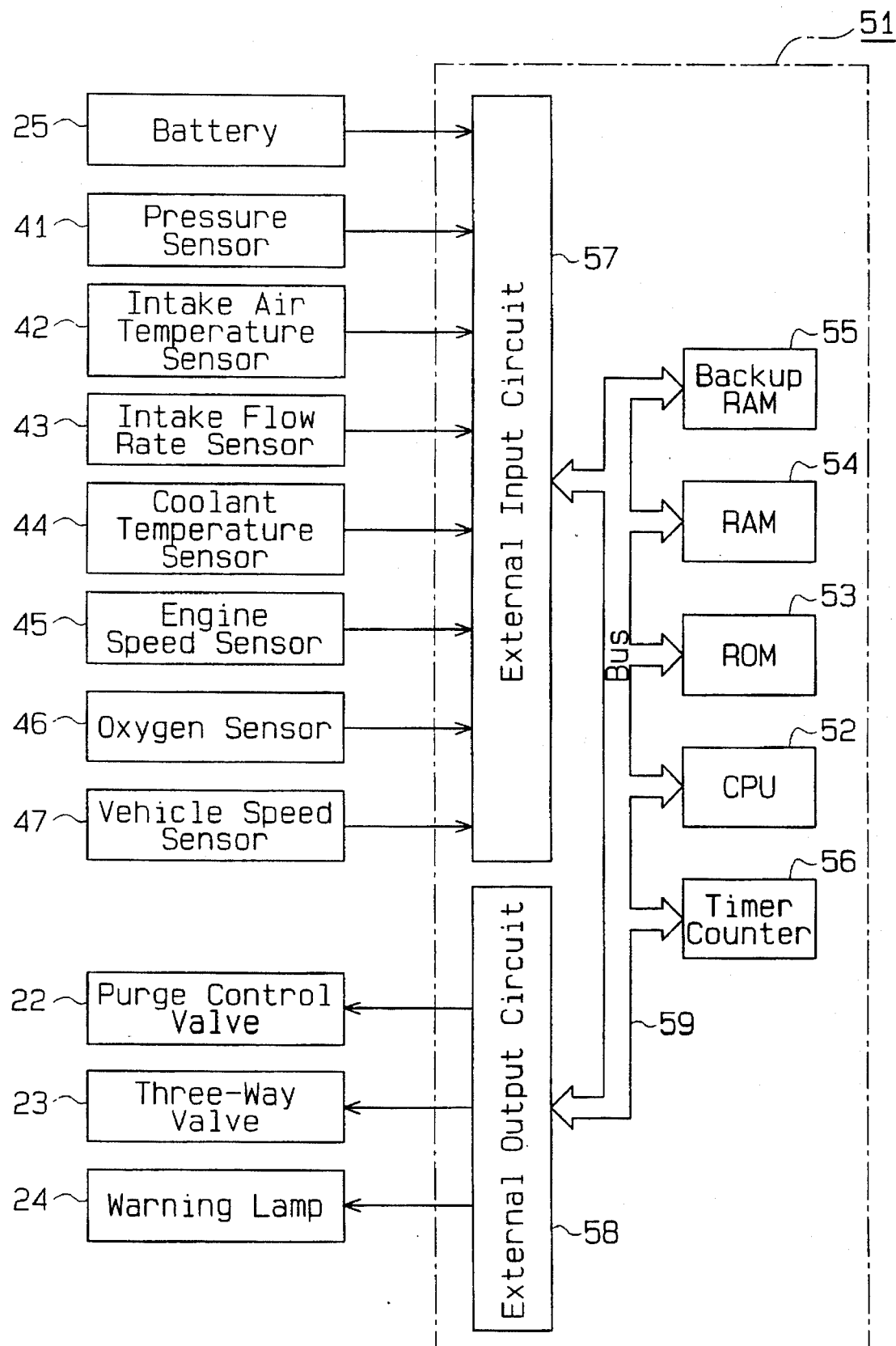
FIG. 2 is a block diagram illustrating the structure of an ECU.

As shown in the block diagram of FIG. 2, the ECU 51 includes a central processing unit (CPU) 52, a read-only memory (ROM) 53, a random access memory (RAM) 54, a backup RAM 55, and a timer counter 56. In the ECU 51, a logical computing circuit is formed by the CPU 52, the ROM 53, the RAM 54, the backup RAM 55, the timer counter 56, an external input circuit 57, an external output circuit 58, and a bus 59, which connects these parts to one another. The ROM 53 prestores a predetermined program related to the fuel purging and malfunction testing. The RAM 54 temporarily stores the computed results of the CPU 52. The backup RAM 55 prestores data. The timer counter 56 simultaneously executes a plurality of time measurements. The external input circuit 57 includes a buffer, a waveform shaping circuit, a hard filter (a circuit having an electric resistor and a condenser), and an analog to digital (A/D) converter. The external output circuit 58 includes a drive circuit. The sensors 41–47 and the battery 25 are connected to the external input circuit 57. The purge control valve 22, the three-way valve 23, and the warning lamp 24 are connected to the external output circuit 58.

The detected signals of the sensors 41–47 and the voltage value VAE of the battery 25 sent via the external input circuit 57 are read by the CPU 52 as input values. The CPU 52 controls the control valve 22, the three-way valve 23, and the warning lamp 24 to perform fuel purging and testing based on the input values.

The processing performed by the ECU 51 will now be described. FIGS. 3 to 13 illustrate a flowchart of a "first testing routine" through which the testing is performed. The ECU 51 periodically executes the routine for every predetermined time period. Control programs related to various routines are prestored in the ROM 53 of the ECU 51.

Figure 3:
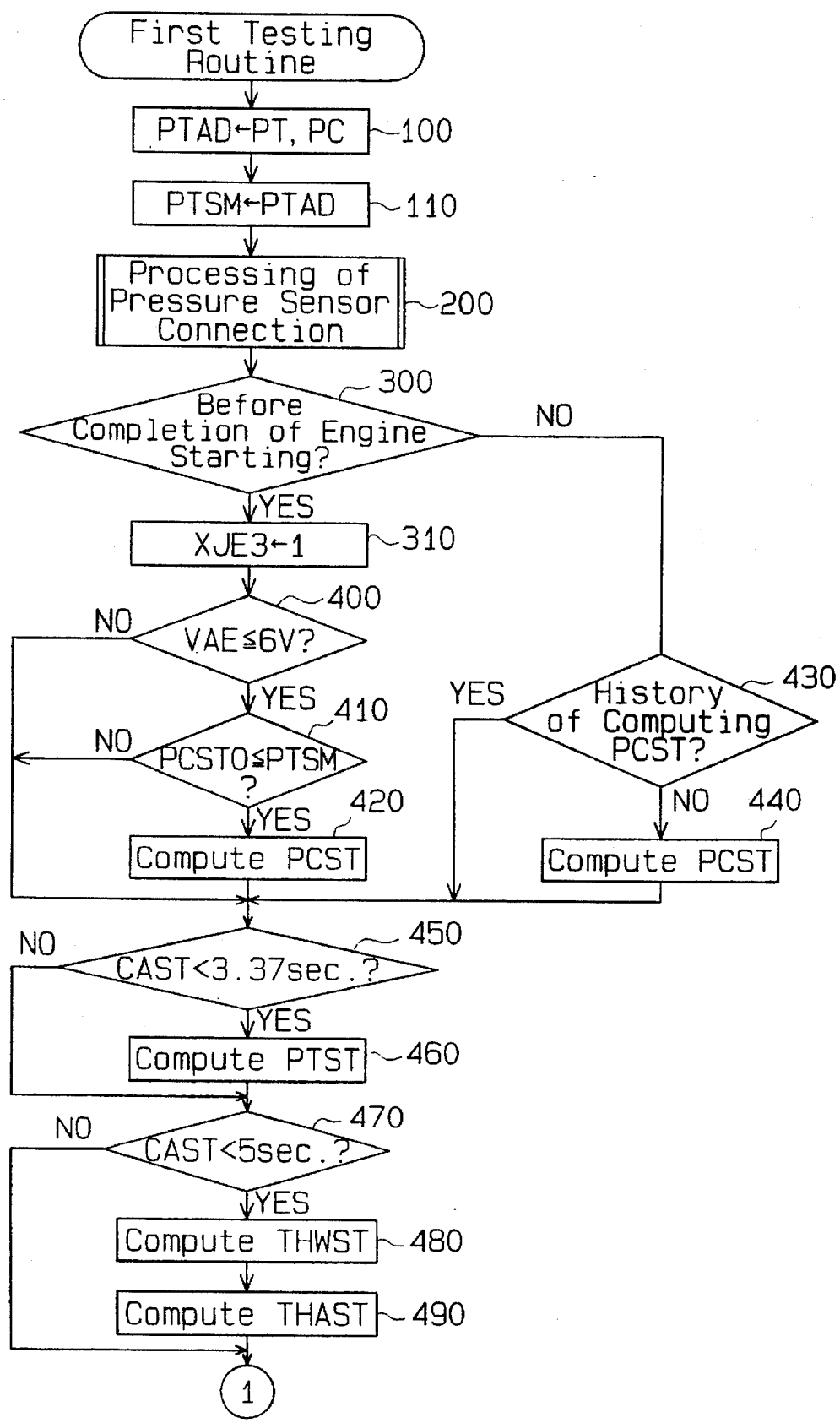
FIG. 3 is a flow chart showing a portion of a "first testing routine"

As illustrated in FIG. 3, in steps 100, 110, the ECU 51 processes the values detected by the pressure sensor 41.

That is, when the three-way valve 23 is not switched by the ECU 51, the pressure sensor 41 is connected to the vapor line 13 at the tank side. Accordingly, in step 100, the ECU 51 processes the tank pressure PT, detected by the pressure sensor 41, in the hard filter and stores the processed value PTAD in the RAM 54. By using the hard filter to process the value of the tank pressure PT, noise of the value detected by the pressure sensor 41 is eliminated.

When the ECU 51 switches the three-way valve 23, the pressure sensor 41 becomes connected to the canister side. Accordingly, in step 100, the ECU 51 processes the canister pressure PC, detected by the pressure sensor 41, in the hard filter and stores a processed value PTAD ("PTAD" is used commonly for both the tank pressure PT and the canister pressure PC) in the RAM 54. In the same manner as the detected value of the tank pressure PT, the usage of the hard filter to process the value of the canister pressure PC eliminates noise of the value detected by the pressure sensor 41.

In step 110, the ECU 51 smoothens the processed value PTAD, or processes the processed value PTAD in a soft filter to obtain an average value, or smoothed value PTSM. The ECU 51 stores the smoothed value PTSM in the RAM 54. The ECU 51 stores the smoothed value PTSM related to the tank pressure PT and the smoothed value PTSM related to the canister pressure PC in the RAM 54. By using the soft filter to process the processed value PTAD, pulsation of the detected value of the pressure sensor 41, caused when time elapses, is eliminated.

In step 200, the ECU 51 determines where the pressure sensor 41 is to be connected and controls the three-way valve 23. That is, the ECU 51 determines whether to connect the pressure sensor 41 to the tank side or the canister side. This process will be described with reference to FIGS. 11 and 12.

At step 201, the ECU 51 incrementally adds the value of a continuation time CTPC to the time measured by the timer counter 56. The continuation time CTPC is timed from when the pressure sensor 41 is connected to the tank side.

At step 202, the ECU 51 judges whether the value of a continuation time CPCT, which is timed from when the connection of the pressure sensor 41 is switched from the tank side to the canister side, is shorter than 0.13 seconds. The ECU 51 incrementally adds the value of the continuation time CPCT through a process described later. The value of 0.13 seconds is merely an example. In this case, when the value of the continuation time CPCT is equal to or longer than 0.13 seconds, the ECU 51 proceeds to steps 217, 218 to connect the pressure sensor 41 to the canister side.

At step 217, the ECU 51 connects the pressure sensor 41 to the canister side by electrically switching the three-way valve 23. To indicate that the pressure sensor 41 has been switched to the canister side, a switching flag XTPC is set to zero. At step 218, the ECU 51 resets the continuation time CTPC to zero.

When the continuation time CPCT is shorter than 0.13 seconds in step 202, the ECU 51 proceeds to step 203 and judges whether a running time CAST is shorter than five minutes. The ECU 51 incrementally adds the value of the running time CAST, which is timed from when the engine 8 is started. The value of five minutes is merely an example. In this case, if the running time CAST is shorter than five minutes, the ECU 51 proceeds to step 204.

At step 204, the ECU 51 judges whether the running time CAST is equal to or longer than 0.13 seconds and lower than 3.76 seconds. The values of 0.13 seconds and 3.76 seconds are merely examples. In this case, if the running time CAST is within the range, the ECU 51 proceeds to step 216 to connect the pressure sensor 41 to the tank side.

At step 216, the ECU 51 connects the pressure sensor 41 to the tank side by stopping the supply of electricity to the three-way valve 23. To indicate the connection to the tank side, the switching flag XTPC is set at one.

If the running time CAST is not in the above range in step 204, the ECU 51 proceeds to step 205 and judges whether the running time CAST is equal to or longer than 8.5 seconds. The value of 8.5 seconds is merely an example. In this case, if the running time CAST is equal to or longer than 8.5 seconds, the ECU 51 proceeds to step 216 to connect the pressure sensor 41 to the tank side. When the running time CAST is shorter than 8.5 seconds, the ECU 51 proceeds to step 217 to connect the pressure sensor 41 to the canister side.

When the running time CAST is equal to or longer than five minutes in step 203, the ECU 51 proceeds to step 206. At step 206, the ECU 51 judges whether a conditional flag XZE is set at zero. The conditional flag XZE indicates whether the conditions required to perform the testing are satisfied. When the conditional flag XZE is set at zero, which indicates that the testing conditions are unsatisfied, the ECU 51 proceeds to step 216 to connect the pressure sensor 41 to the tank side. If the conditional flag XZE is set at one, which indicates that the testing conditions are satisfied, the ECU 51 proceeds to step 207.

At step 207, the ECU 51 judges whether the various types of tests have been completed. That is, the ECU 51 judges whether the canister side sealing, the purge control valve 22, and the three-way valve 23 have all been tested. If each testing has been completed, the ECU 51 proceeds to step 216 to connect the pressure sensor 41 to the tank side. In the case that these tests have not been completed, the ECU 51 proceeds to step 208.

At step 208, the ECU 51 judges whether certain conditions are satisfied. These conditions consist of the canister side being in a sealed state, history flags XJC, XJ3 being set at zero, and either the vehicle speed SPD being lower than seven km/h or the elapsed time CPGCF, timed from when the canister side test is completed, being equal to or longer than five seconds. The history flag XJC indicates the history of malfunctions such as the purge control valve 22 being fixed to the casing with its valve body in a closed state. The history flag XJ3 indicates the history of malfunctions in which switching of the three-way valve 23 were impossible. When these conditions are satisfied, the ECU 51 proceeds to step 216 to connect the pressure sensor 41 to the tank side. If these conditions are not satisfied, the ECU 51 proceeds to step 209.

At step 209, the ECU 51 judges whether certain conditions are satisfied. These conditions consist of the canister side in a state that is not airtight, either one of the history flags XJC, XJ3 being set at one, and the vehicle speed SPD being equal to or higher than three km/h. When these conditions are satisfied, the ECU 51 proceeds to step 216 to connect the pressure sensor 41 to the tank side. If these conditions are not satisfied, the ECU 51 proceeds to step 210.

At step 210, the ECU 51 judges whether there is a history of the computation of a tank pressure PTPN, which value indicates the pressure to be detected during purging of the fuel to the intake passage 10 from the canister 14. When there is no computation history, the ECU 51 proceeds to step 216 to connect the pressure sensor 41 to the tank side. If there is a computation history, the ECU 51 proceeds to step 211.

At step 211, the ECU 51 judges whether an elapsed time CDPTS is shorter than five seconds while also judging whether a malfunction flag XV3 is zero. The elapsed time CDPTS indicates the time period starting when computation of a pulsation value DPTASM is initiated in the case that pulsation of the tank pressure PT occurs. The malfunction flag XV3 indicates the test result of the three-way valve 23. In other words, in step 211, the ECU 51 judges whether the computation of the pulsation value DPTASM of the tank pressure PT is incomplete while also judging whether the determination of the state of the three-way valve 23 is incomplete. The pulsation value DPTASM is obtained when the output of the pressure sensor 41 is indicated by a rectangular wave. When these conditions are satisfied, the ECU 51 proceeds to step 216 to connect the pressure sensor 41 to the tank side. If these conditions are not satisfied, the ECU 51 proceeds to step 212.

At step 212, the ECU 51 judges whether the value of a purge concentration FGPG, which is calculated based on the value detected by the oxygen sensor 46, is equal to or greater than 0.95 and whether the value of the purge concentration FGPGI, purged during idling of the engine 8, is equal to or greater than 0.90. The values of 0.95, 0.90, which are exemplary, indicate that the purge concentrations FGPG, FGPGI are both relatively lean. When these conditions are not satisfied, the ECU 51 proceeds to step 300 shown in FIG. 3. If these conditions are satisfied, the ECU 51 proceeds to step 213.

At step 213, the ECU 51 judges whether the value of the duty ratio DPG, which is related to the opening of the purge control valve 22, is equal to or greater than 18%. The value of 18% is merely an example. In this case, when the value of the duty ratio DPG is lower than 18%, the ECU 51 proceeds to step 300. If the duty ratio DPG is equal to or greater than 18%, the ECU 51 proceeds to step 214.

At step 214, the ECU 51 judges whether an engine load GN is lower than a reference value c1. The ECU 51 utilizes a separate routine to calculate the engine load GN from the air intake flow rate Q, detected by the intake flow rate sensor 43, and the engine speed NE, detected by the engine speed sensor 45. In this case, when the engine load GN is equal to or higher than the reference value c1, indicating that the engine load GN is rather large, the ECU 51 proceeds to step 300. If the engine load GN is smaller than the reference value c1, the ECU 51 proceeds to step 215.

At step 215, the ECU 51 determines whether the continuation time CTPC, which indicates how long the pressure sensor 41 has been connected to the tank side, is equal to or longer than five seconds. The value of five seconds is merely an example. In this case, when the continuation time CTPC is shorter than five seconds, the ECU 51 proceeds to step 300. If the continuation time CTPC is equal to or longer than five seconds, the ECU 51 proceeds to step 217 to connect the pressure sensor 41 to the canister side.

According to the above sequence of steps, the pressure sensor 41 is connected to the canister side when the engine 8 is started. The pressure sensor 41 is then connected to the tank side during the time range of 0.13 seconds to 3.76 seconds after starting the engine 8. During the time range of 3.76 seconds to 8.5 seconds after starting the engine 8, the pressure sensor 41 is connected to the canister side. After 8.5 seconds, the pressure sensor 41 is connected to the tank side.

As shown in FIG. 3, in steps 300 and 310, the ECU 31 sets a completion flag XJE3 at approximately when the engine 8 is started. The completion flag XJE3 indicates the completion of the test of the three-way valve 23.

That is, at step 300, the ECU 51 judges whether the starting of the engine 8 has been completed. This is determined by judging whether the engine speed NE is lower than a predetermined value, e.g., 450 rpm, from the value detected by the engine speed sensor 45. When the starting of the engine 8 has not been completed, the ECU 51 sets the completion flag XJE3 at one in step 310 and then proceeds to step 400. When the starting of the engine 8 has been completed, the ECU 51 proceeds to step 430 from step 300.

In steps 400 to 490, the ECU 51 processes the value detected by the pressure sensor 41 during the timing when the starting of the engine 8 is about to be completed.

At step 400, the ECU 51 judges whether the voltage VAE of the battery 25 is equal to or lower than 6 V. The ECU 51 compares the output value from the pressure sensor 41 with a predetermined value and then reads the value. In this case, a reference voltage employed as the predetermined value is determined based on the battery voltage VAE. When the battery voltage is equal to or lower than 6 V, sufficient voltage required for the reference value is not obtained. Insufficient voltage results in an inaccurate reading from the pressure sensor 41.

At step 410, the ECU 51 judges whether a canister pressure PCSTO, previously obtained when starting the engine 8, is equal to or lower than the smoothed value PTSM of the currently obtained tank pressure PT. When the canister pressure PCSTO is greater than the smoothed value PTSM, the ECU 51 proceeds to step 450. If the canister pressure PCSTO is greater than the smoothed value PTSM, the ECU 51 proceeds to step 420. At step 420, the ECU 51 calculates the canister pressure PCST (equal to the smoothed value PTSM of the tank pressure PT) during the current starting of the engine 8 from the detected value of the pressure sensor 41, and stores the calculated result in the RAM 54.

When the ECU 51 proceeds to step 430 from step 300, the ECU 51 judges whether there is a history of computation of the canister pressure PCST during the starting of the engine 8. When such history exists, the ECU 51 proceeds to step 450. If such history does not exist, the ECU 51 proceeds to step 440 and computes the canister pressure PCST (equal to the smoothed value PTSM of the tank pressure PT) during the current starting of the engine 8 from the detected value of the pressure sensor 41. The ECU 51 stores the calculated result.

At step 450, the ECU 51 determines whether the running time CAST is shorter than 3.37 seconds. The value of 3.37 seconds is merely an example. In this case, when the running time CAST is shorter than 3.37 seconds, the ECU 51 proceeds to step 460 and computes the canister pressure PTST (the smoothed value PTSM of the tank pressure PT) during the starting of the engine 8 from the detected value of the pressure sensor 41. The ECU 51 stores the calculated result in the RAM 54. When the running time CAST is equal to or longer than 3.37 seconds, the ECU 51 proceeds to step 470. That is, the ECU 51 keeps the canister pressure PCST during the starting of the engine 8 stored until the starting of the engine 8 is completed. After completion of the engine starting, the tank pressure PTST during the starting of the engine is stored in the RAM 54 until 3.37 seconds elapse from when the engine is started.

At step 470, the ECU 51 judges whether the running time CAST is shorter than five seconds. The value of five seconds is merely an example. In this case, when the running time CAST is equal to or longer than five seconds, the ECU 51 proceeds to step 500. If the running time CAST is shorter than five seconds, the ECU 51 proceeds to step 480 and calculates a starting coolant temperature THWST (equal to the smoothed value of the coolant temperature THW) based on the value detected by the coolant temperature sensor 44. The ECU 51 stores the calculated result in the RAM 54. At step 490, the ECU 51 calculates the starting intake air temperature THAST (smoothed value of the intake air temperature THA) based on the value detected by the intake air temperature sensor 42 and stores the calculated result in the RAM 54. That is, the ECU 51 keeps the starting temperature THWST and the starting intake air temperature THAST stored in the RAM 54 until five seconds elapses from after the engine 8 is started.

Figure 4:
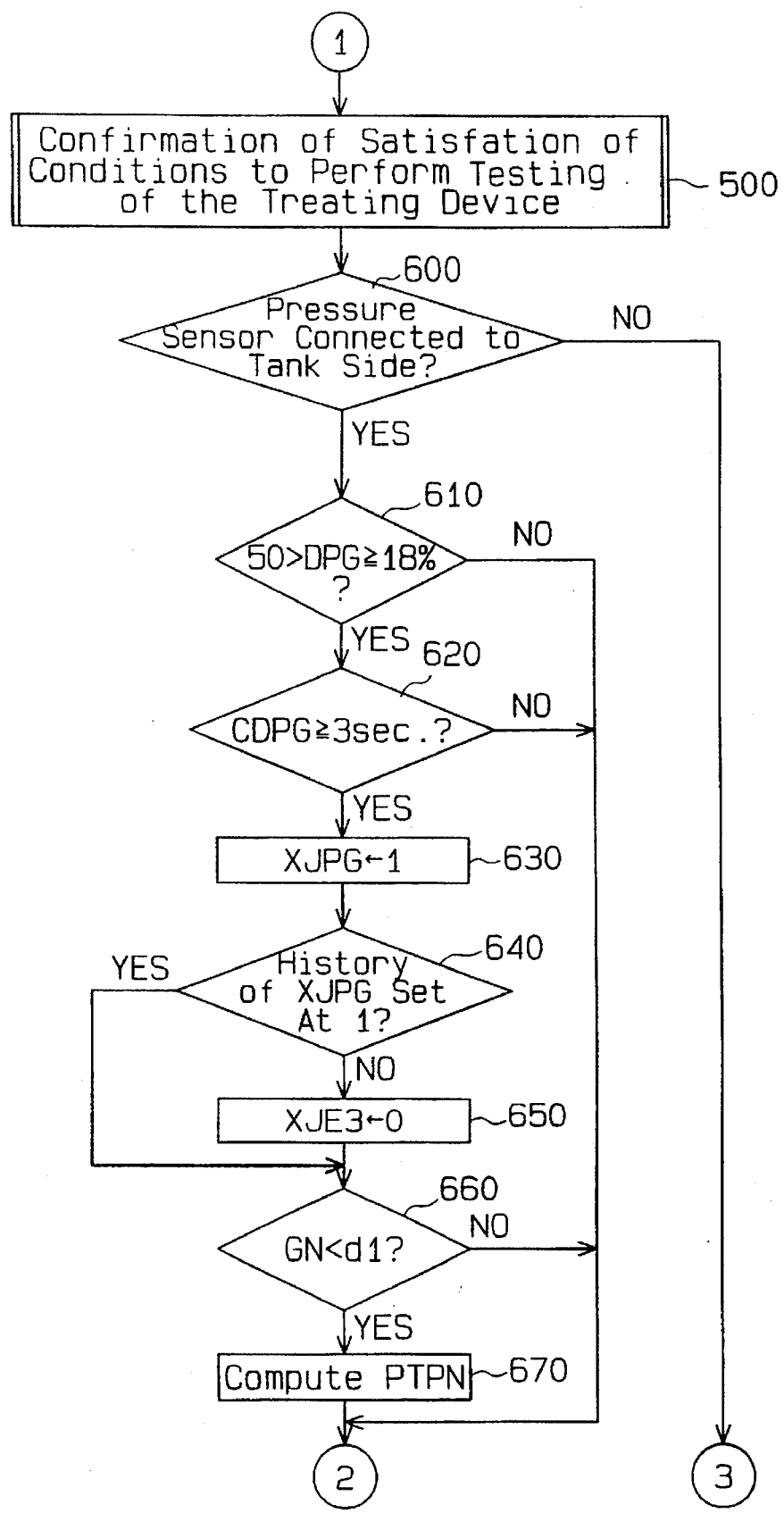
FIG. 4 is a flow chart continuing from FIG. 3.
Figure 13:
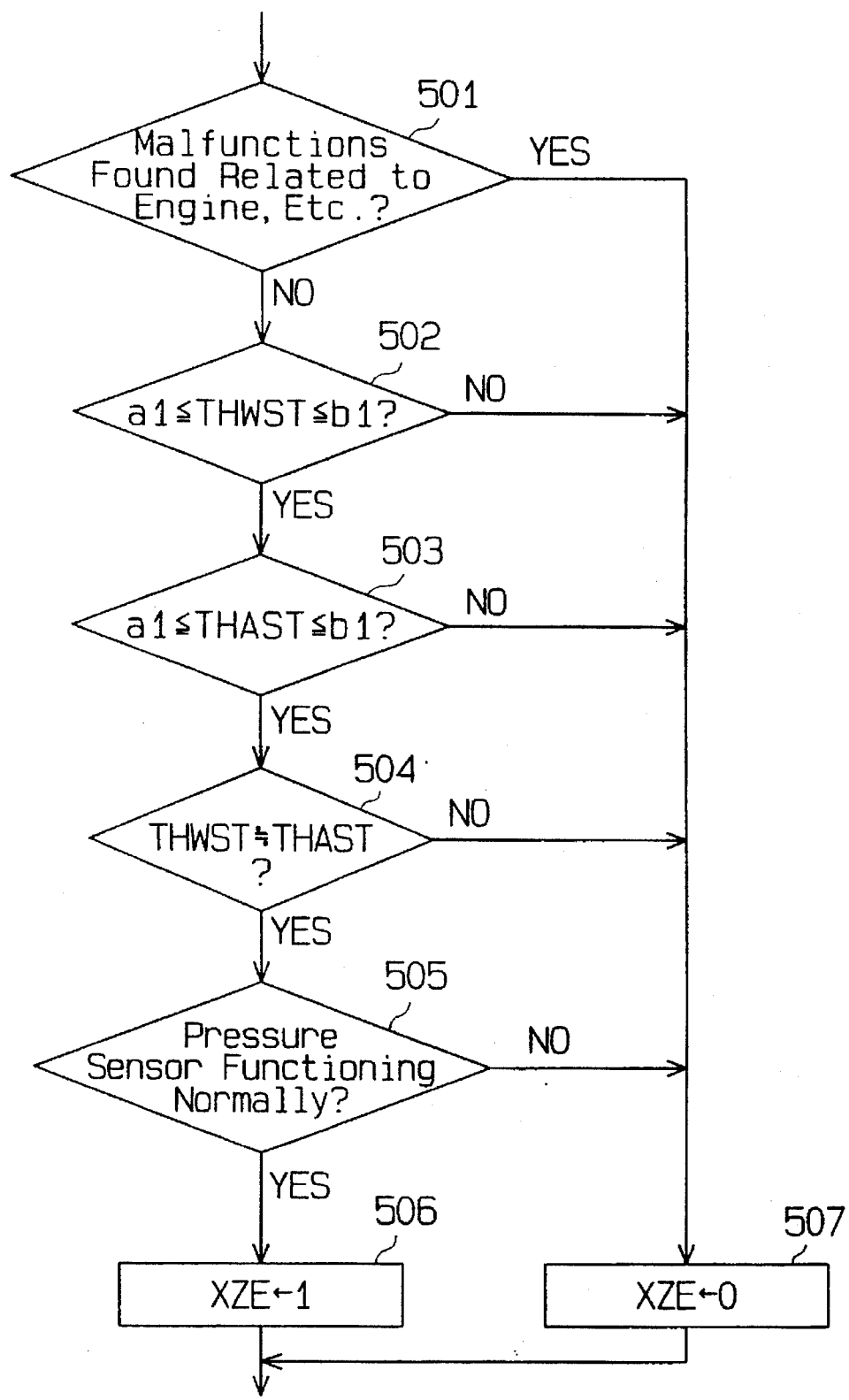
FIG. 13 is a flow chart illustrating a portion of the routine in FIG. 4 in detail.

As shown in FIG. 4, the ECU 51 processes the conditions required for the performance of the test of the treating device in step 500. The contents of the processing are shown in FIG. 13.

At step 501, the ECU 51 judges whether no malfunctions related to parts other than the treating device, such as the engine 8, have been found. The ECU 51 judges the occurrence of such malfunctions from the signals detected by the sensors 42–47. When these malfunctions are found, the conditions required to perform testing of the treating device are not satisfied. Thus, at step 507 the ECU 51 sets the conditional flag XZE at zero. When it is determined that there are no malfunctions, which are related to parts other than the treating device, the ECU 51 proceeds to step 502.

At step 502, the ECU 51 judges whether the starting coolant temperature THWST is within a range of predetermined values a1 to b1. The range of the predetermined values a1 to b1 refers to the temperature range in which fuel evaporation takes place. When the starting coolant temperature THWST is not within the range of the predetermined values a1 to b1, which indicates that the conditions required to test the treating device are not satisfied, the ECU 51 proceeds to step 507. If the starting temperature THWST is within the range of the predetermined values a1 to b1, the ECU 51 proceeds to step 503.

At step 503, the ECU 51 judges whether the starting intake air temperature THAST, which indicates the temperature of the intake air during starting of the engine 8, is within the range a1 to b1. When the starting intake air temperature THAST is not within the range a1 to b1, indicating that the conditions required to test the treating device are not satisfied, the ECU 51 proceeds to step 507. When the starting intake air temperature THAST is within the range of the predetermined values a1 to b1, the ECU 51 proceeds to step 504.

At step 504, the ECU 51 judges whether there is no difference between the values of the starting coolant temperature THWST and the starting intake air temperature THAST. When there is a difference between the two temperatures, indicating that the conditions required for testing the treating device are not satisfied, the ECU 51 proceeds to step 507. If there is no difference between the two values, the ECU 51 proceeds to step 505.

As step 505, the ECU 51 judges whether the pressure sensor 41 is functioning normally. The ECU 51 executes a test of the pressure sensor 41 through a different processing routine. When a malfunction in the pressure sensor 41 is confirmed, and one of the conditions required for testing of the treating device is unsatisfied, the ECU 51 proceeds to step 507. If the pressure sensor 41 is functioning properly, the ECU 51 proceeds to step 506 and sets the conditional flag XZE to one to indicate that the conditions required for testing of the treating device are satisfied.

After processing of the steps related to the conditions required for the testing of the treating device, the ECU 51 proceeds to step 600, shown in FIG. 4. In steps, 600 to 670, the ECU 51 calculates the value of the tank pressure PTPN during fuel purging.

At step 600, the ECU 51 judges whether the pressure sensor 41 is connected to the tank side. The ECU 51 determines the connection from the controlling history of the three-way valve 23. When the pressure sensor 41 is connected to the canister side, the ECU 51 proceeds to step 800. If the pressure sensor 41 is connected to the tank side, the ECU 51 proceeds to step 610.

At step 610, the ECU 51 judges Whether the value of the duty ratio DPG is within the range of equal to or greater than 18% to lower than 50%. Duty control of the purge control valve 22 during operation of the engine 8 causes pulsation of the negative intake pressure applied to the purge line 21 from the intake air passage 10. The above range is the range in which pulsation is apt to occur. The values of 18% to 50% is merely an example. When the duty ratio DPG is not included in this range, indicating that pulsation is unlikely to occur, the ECU 51 proceeds to step 700. If the duty ratio DPG is included in this range, indicating that pulsation is apt to occur, the ECU 51 proceeds to step 620.

At step 620, the ECU 51 judges whether the delayed time CDPG, timed from when fuel purging is commenced, is equal to or longer than three seconds. When fuel purging is commenced, a certain period of time is necessary until the pressure change is transmitted to the pressure sensor 41. Step 620 compensates for the delay in the transmission of pressure after commencement of the purging. The value of three seconds is merely an example. In this case, when the delayed time CDPG is shorter than three seconds, the ECU 51 proceeds to step 700. If the delayed time CDPG is equal to or longer than three seconds and thus ensures commencement of fuel purging, the ECU 51 proceeds to step 630 and sets the fuel purge commencement flag XJPG to one.

At step 640, the ECU 51 judges whether the commencement flag XJPG has a history of being set at one. If there is no such history, the commencement flag XJPG is set at one for the first time. In this case, the ECU 51 proceeds to step 650 and sets the completion flag XJE3 to zero indicating that the testing of the three-way valve 23 has been completed. Afterwards, the ECU 51 proceeds to step 660. When a history of the commencement flag XJPG being set at one is confirmed at step 640, the ECU 51 proceeds to step 660.

At step 660, the ECU 51 judges whether the engine load GN is smaller than a predetermined reference value d1. When the engine load GN is equal to or greater than a reference value d1, the ECU 51 proceeds to step 700. If the engine load GN is smaller than the reference value d1, which indicates that the engine load GN is rather small, the ECU 51 proceeds to step 670. At step 670, the ECU 51 computes the value of the tank pressure PTPN (equal to the smoothed value PTSM of the tank pressure PT) during fuel purging and stores the calculated value in the RAM 54. The ECU 51 then proceeds to step 700.

Figure 5:
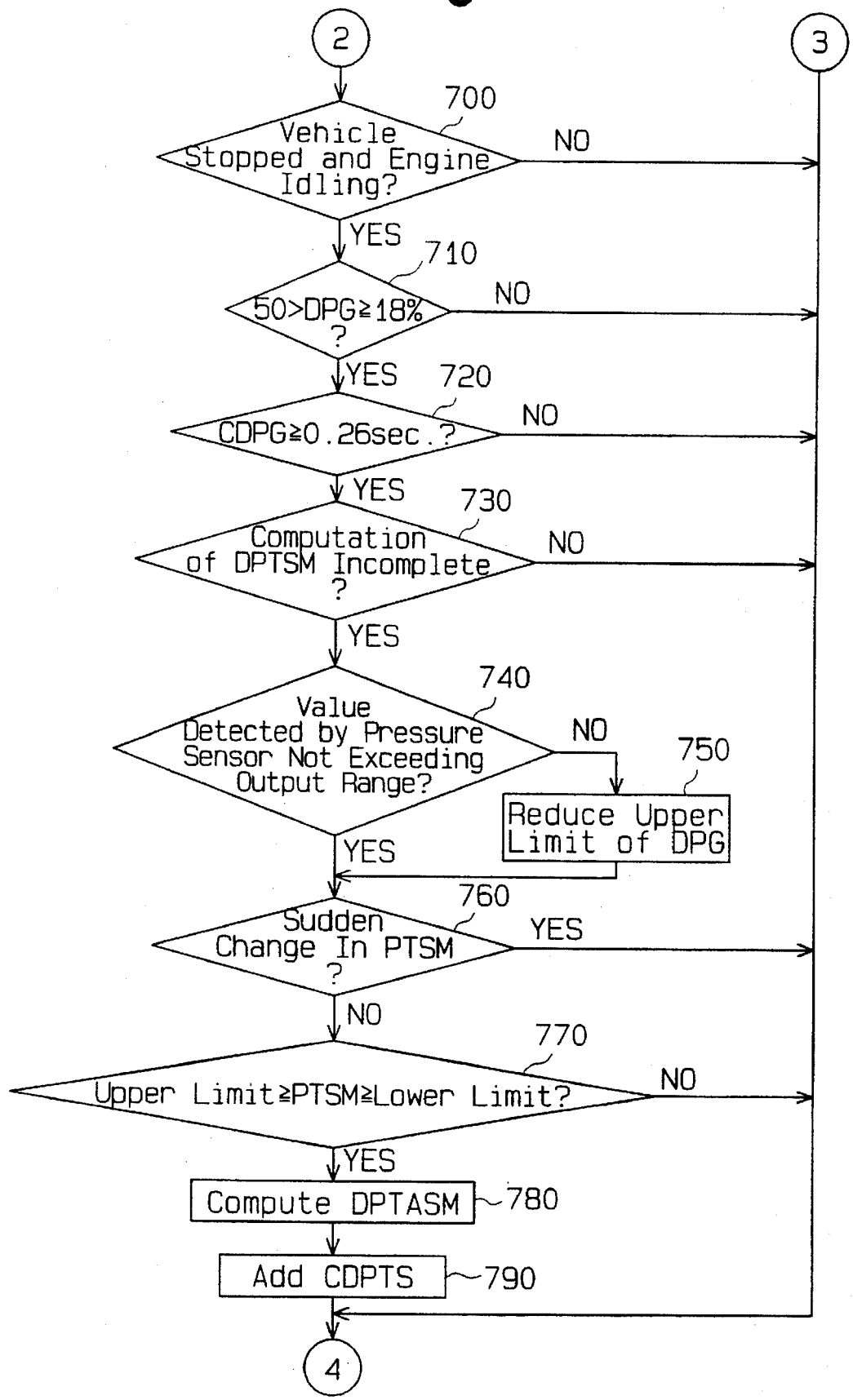
FIG. 5 is a flow chart continuing from FIG. 4.

As shown in FIG. 5, in steps 700-790, the ECU 51 computes the pulsation value DPTASM of the tank pressure PT to judge whether there is a pulsation in the tank pressure PT. The ECU 51 also calculates a differential value (differential smoothed value) DPTSM related to the smoothed value PTSM of the tank pressure PT used in the computation of the pulsation value DPTASM.

At step 700, the ECU 51 judges whether the vehicle is stopped and the engine 8 is idling from the detected values of the engine speed NE and the vehicle speed SPD. Vibrations caused by the movement of the vehicle may cause instantaneous opening of the vapor control valve 20 and result in a change in the tank pressure PT. The ECU 51 executes step 700 to avoid such changes and to calculate stable values. When the vehicle is not moving and the engine is not idling, the ECU decides not to compute the differential smoothed value DPTSM and proceeds to step 800. If the vehicle is not moving and the engine 8 is idling, the ECU 51 proceeds to step 710.

At step 710, the ECU 51 determines whether the value of the duty ratio DPG is in the range of equal to or greater than 18% and smaller than 50%. When the duty ratio DPG is not within this range, indicating that pulsation of the pressure is not likely to occur, the ECU 51 proceeds to step 800. When the duty ration DPG is within this range, indicating that pulsation of the pressure is likely occur, the ECU 51 proceeds to step 720.

At step 720, the ECU 51 judges whether the delayed time CDPG, timed from when the fuel purging is commenced, is equal to or longer than 0.26 seconds. The value of 0.26 seconds is merely an example. In this case, when the delayed time CDPG is shorter than 0.26 seconds, the ECU 51 proceeds to step 800. If the delayed time CDPG is equal to or longer than 0.26 seconds, ensuring that fuel purging has been commenced and the pulsation of the pressure in the purge line 21 has been transmitted to the pressure sensor 41, the ECU 51 proceeds to step 730.

At step 730, the ECU 51 determines whether calculation of the differential smoothed value DPTSM is incomplete. The ECU 51 determines whether the calculation has been completed by judging if the time elapsed from when computation of the differential smoothed value DPTSM has been commenced is shorter than a predetermined length of time. When the computation has been completed, the ECU 51 proceeds to step 800. If the computation is incomplete, the ECU 51 proceeds to step 740.

At step 740, the ECU 51 judges whether the value detected by the pressure sensor 41 does not exceed the output range of the sensor 41. When the detected value exceeds the output range, which indicates that the negative pressure acting on the pressure sensor 41 is excessive and thus pressure pulsation is unlikely to occur in the purge line 21, the ECU 51 proceeds to step 750. At step 750, the ECU 51 lowers the upper limit value of the duty ratio DPG to suppress the detected value of the pressure sensor 41 within the range of its output range and then proceeds to step 760 afterwards. For example, the ECU 51 decreases the upper limit value of the duty ratio DPG to 30% from 50%. By decreasing the upper limit value of the duty ratio DPG, pressure pulsation becomes apt to occur in the purge line 21. When the detected value of the pressure sensor 41 does not exceed the output range, the ECU 51 proceeds to step 760 from step 740.

At step 760, the ECU 51 judges whether there is a sudden change in the smoothed value PTSM. When there is a sudden change in the smoothed value PTSM, the ECU 51 prohibits the computing of the pulsation value DPTASM and then proceeds to step 800. If there is no sudden change in the smoothed value PTSM, the ECU 51 proceeds to step 770 to allow the computing of the pulsation value DPTASM.

At step 770, the ECU 51 judges whether the smoothed value PTSM is within the range between values of the predetermined upper limit and lower limit. When the smoothed value PTSM is outside the range, the ECU 51 proceeds to step 800 to prohibit the tank side pulsation value DPTASM. If the smoothed value is within the range, the ECU 51 proceeds to step 780 to allow computing of the pulsation value DPTASM.

At step 780, the ECU 51 computes the tank side pulsation value DPTASM and stores the computed result in the RAM 54. The ECU 51 computes the tank side pulsation value DPTASM based on the following equation (1):

$$DPTASM = DPTASMO + (|PTAD - PTSM|) \quad \ldots (1)$$

DPTASMO represents the previously obtained pulsation value. The ECU 51 obtains the pulsation value DPTASM by incrementally adding the absolute value of the difference between the processed value PTAD, processed by the hard filter, and the average value, or smoothed value PTSM, processed by the hard filter and the soft filter. The pulsation value DPTASM reflects the pulsation of pressure. When the absolute value of the difference between the values PTAD and PTSM is smaller than a certain lower limit value, there is a possibility that the difference indicates the production of noise. In this case, the ECU 51 sets the difference of the values PTAD and PTSM as zero and reflects this in the computation. Through this process, unreliable data is excluded from the computation of the pulsation value DPTASM.

At step 790, the ECU 51 incrementally adds the elapsed time CDPTS, to the time measured by the timer counter 56 from when the computation of the tank side pulsation value DPTASM is initiated, and then proceeds to step 800.

Figure 6:
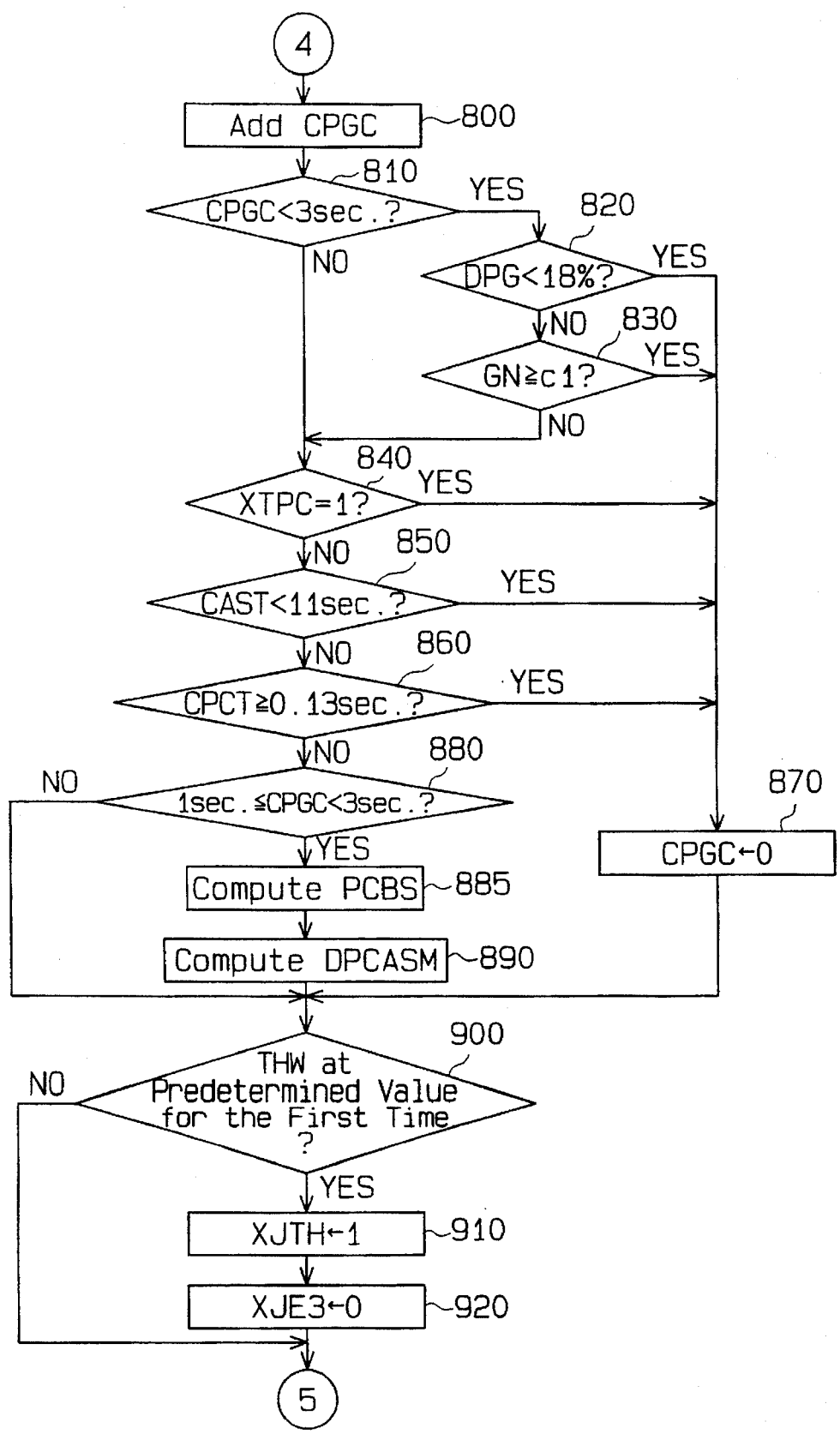
FIG. 6 is a flow chart continuing from FIG. 5.

In steps 800-890 shown in FIG. 6, the ECU 51 manipulates the timer counter 56 to check the canister pressure PC and compute the pulsation value DPCASM, which is related to the canister pressure PC.

That is, at step 800, the ECU 51 incrementally adds an elapsed time CPGC, timed by the timer counter 56 from when the checking of the canister pressure PC is initiated.

At step 810, the ECU 51 judges whether the elapsed time CPGC is shorter than three seconds. The value of three seconds is merely an example. When the elapsed time CPGC is equal to or longer than three seconds, the ECU 51 proceeds to step 840. If the elapsed time CPGC is shorter than three seconds, the ECU 51 proceeds to step 820.

At step 820, the ECU 51 judges whether the duty ratio DPG of the purge control valve 22 is lower than 18%. When the duty ratio is lower than 18%, indicating that the opening of the purge control valve 22 is too small to obtain the pulsation value DPCASM, the ECU 51 proceeds to step 870. At step 870, the ECU 51 resets the elapsed time CPGC to zero and then proceeds to step 900. If the duty ratio DPG is equal to or greater than 18%, the ECU 51 proceeds to step 830 from step 820.

At step 830, the ECU 51 judges whether the value of the engine load GN is equal to or greater than a predetermined reference value c1. When the engine load GN is equal to or greater than the reference value c1, which indicates that the negative pressure in the purge line 21 is insufficient, the ECU 51 proceeds to step 870. If the engine load GN is lower than the reference value c1, the ECU 51 proceeds to step 840.

At step 840, the ECU 51 judges whether the switching flag XTPC, which indicates where the pressure sensor 41 is connected to, is set to one. When the switching flag XTPC is set to one, indicating that the pressure sensor 41 is connected to the tank side, the canister side pulsation value DPCASM may not be obtained. Thus, the ECU 51 proceeds to step 870. If the switching flag XTPC is set at zero, indicating that the pressure sensor 41 is connected to the canister side, the ECU 51 proceeds to step 850.

At step 850, the ECU 51 judges whether the running time CAST, which is timed from when the engine 8 is started, is shorter than 11 seconds. When the running time CAST is shorter than 11 seconds, which indicates that a sufficient length of time has not elapsed since the starting of the engine 8, the ECU 51 proceeds to step 870. If the running time CAST is equal to or longer than 11 seconds, which indicates that a sufficient length of time has elapsed since the starting of the engine 8, the ECU 51 proceeds to step 860.

At step 860, the ECU 51 judges whether the continuation time CPCT, which is timed from when the connection of the pressure sensor 41 is switched from the tank side to the canister side, is equal to or longer than 0.13 seconds. When the continuation time CPCT is equal to or longer than 0.13 seconds, the ECU 51 proceeds to step 870. If the continuation time CPCT is shorter than 0.13 seconds, the ECU 51 proceeds to step 880. In the case that the ECU 51 proceeds to step 880, an adequate amount of pressure pulsation takes place in the purge line 21 in correspondence with the adjustment of the purge control valve 22.

The elapsed time CPGC is reset to zero and the incremental adding is restarted when the elapsed time CPGC becomes equal to or longer than three seconds and either 1) the switching flag XTPC is set to one or 2) after 11 seconds from the starting of the engine 8, 0.13 seconds has elapsed after the pressure sensor 41 is connected to the canister side from the tank side. The flag XTPC indicates indicating that the pressure sensor 41 is connected to the tank side. Once the vehicle starts moving, the pressure sensor 41 becomes connected to the tank side only when the vehicle is subsequently stopped.

At step 880, the ECU 51 judges whether the elapsed time CPGC, timed from when the checking of the canister pressure PC is initiated, is within the range starting from a length of time equal to or longer than one second to lower than three seconds. When the elapsed time CPGC is not within the range, the ECU 51 proceeds to step 900. When the elapsed time CPGC is within the range, indicating that the pressure sensor 41 is connected to the canister side, the ECU 51 proceeds to step 885, 890. An upper limit and a lower limit are set for the timing of the execution of the steps 885, 890.

At step 885, the ECU 51 computes the reference value PCBS of the canister pressure with respect to the current timing. The computed reference value PCBS is stored in the RAM 54.

At step 890, the ECU 51 computes the canister side pulsation value DPCASM and stores the computed result in the RAM 54. The ECU 51 computes the pulsation value DPCASM from the following equation (2):

$$DPCASM = DPCASMO + (|PTAD - PTSM|) \quad \ldots (2)$$

DPCASMO represents the previously obtained pulsation value. The ECU 51 obtains the pulsation value DPCASM by incrementally adding the absolute value of the difference between the processed value PTAD, processed by the hard filter, and the average value, or smoothed value PTSM, processed by the hard filter and the soft filter. The pulsation value DPCASM reflects the pulsation of pressure. When the absolute value of the difference between the values PTAD and PTSM is smaller than a certain lower limit value, there is a possibility that the difference indicates the production of noise. In this case, the ECU 51 sets the difference of the values PTAD and PTSM to zero and reflects this in the computation. Through this process, unreliable data is excluded from the computation of the pulsation value DPCASM.

In steps 880, 890, the ECU 51 computes the canister pulsation value DPCASM during the time range of equal to or lower than one second to shorter than three seconds after the checking of the canister pressure PC is initiated. This timing coincides with the timing in which the ECU 51 performs testing of the canister side.

In steps 900–920, the ECU 51 executes processing related to the three-way valve 23.

At step 900, the ECU 51 judges whether the coolant temperature THW has reached the predetermined value, which fuel purging is commenced at, for the first time. The predetermined value of the coolant temperature THW corresponds to the value of the temperature after the engine 8 is warmed. The predetermined value is also one of the conditions required to start fuel purging. When the coolant temperature THW reaches the predetermined value for the first time, indicating that fuel purging will be performed for the first time, the ECU 51 sets the fuel purging initiation flag XJTH to one at step 910. At step 920, the ECU 51 resets the completion flag XJE3, which indicates that the testing of the three-way valve has been completed, to zero and proceeds to step 1000.

Figure 7:
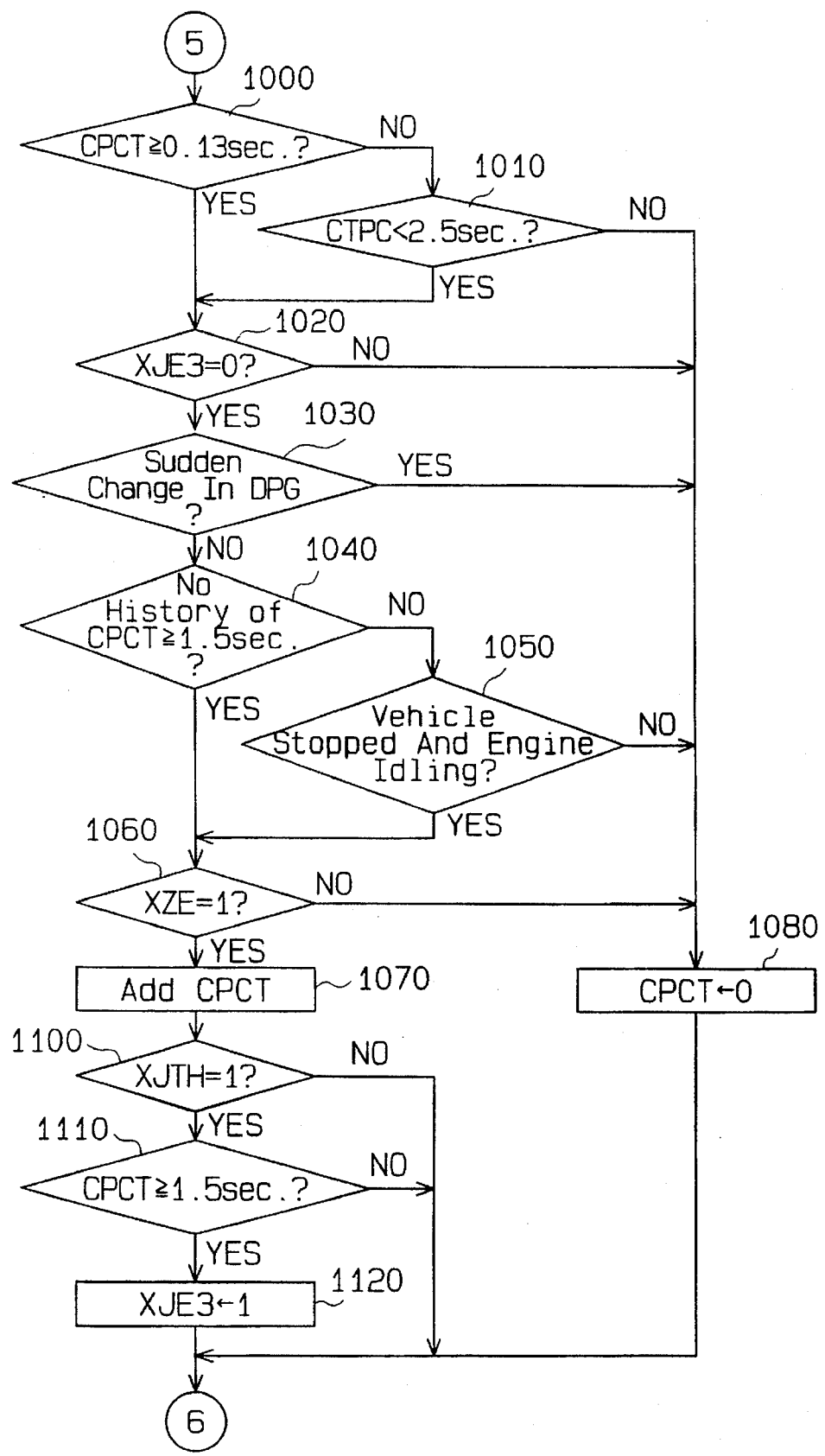
FIG. 7 is a flow chart continuing from FIG. 6.

In steps 1000–1080, which are shown in FIG. 7, the ECU 51 manipulates the continuation time CPCT, timed from when the connection of the pressure sensor 41 is switched from the tank side to the canister side.

At step 1000, the ECU 51 judges whether the continuation time CPCT is equal to or longer than 0.13 seconds. When the continuation time CPCT is shorter than 0.13 seconds, the ECU 51 proceeds to step 1010 and judges whether the elapsed time CTPC, timed from when the pressure sensor 41 is connected to the tank side, is shorter than 2.5 seconds. The value of 2.5 seconds is merely an example. In this case, when the continuation time CTPC is equal to or longer than 2.5 seconds, the ECU 51 proceeds to step 1080 and resets the continuation time CPCT to zero. The ECU 51 then proceeds to step 1200. If the continuation time CTPC is shorter than 2.5 seconds, the ECU 51 proceeds to step 1020. That is, in step 1010, the ECU 51 detects the tank pressure PT within a sufficient time of 2.5 seconds before switching the connection of the pressure sensor 41 from the tank side to the canister side. If the continuation time CPCT is equal to or longer than 0.13 seconds in step 1000, the ECU 51 proceeds to step 1020.

At step 1020, the ECU 51 judges whether the completion flag XJE3 is set at zero. When the completion flag XJE3 is set at one indicating that the testing of the three-way valve 23 has been completed, the ECU 51 proceeds to step 1080. If the completion flag XJE3 is set at zero indicating that the testing of the three-way valve 23 has not been completed, the ECU 51 proceeds to step 1030.

At step 1030, the ECU 51 judges whether there has been a sudden change in the duty ratio DPG value of the purge control valve 22. A sudden change in the duty ratio DPG value indicates a sudden change in the canister pressure PC. Thus, it is confusing determining whether the behavior of the value detected by the pressure sensor 41 is caused by a sudden change in the canister pressure PC or by the switching of the pressure sensor 41 connection. The ECU 51 executes step 1030 to avoid confusion. When there is a sudden change in the value of the duty ratio DPG, the ECU 51 proceeds to step 1080. If there is no sudden change in the value of the duty ratio DPG, the ECU 51 proceeds to step 1040.

At step 1040, the ECU 51 judges whether the continuation time CPCT has a no history of becoming equal to or longer than the upper limit of 1.5 seconds. When it is determined that there is such a history, the ECU 51 proceeds to step 1050 and judges whether the vehicle is in a stopped state with the engine 8 idling. If it is determined that this condition is not satisfied at step 1050, the ECU 51 proceeds to step 1080. When it is determined that this condition is satisfied at step 1050, the ECU 51 proceeds to step 1060.

If it is determined that there is no history of the continuation time CPCT becoming equal to or longer than 1.5 seconds at step 1040, the ECU 51 proceeds to step 1060. In other words, the ECU 51 proceeds to step 1060 immediately before the pressure sensor 41 switches the section which it is connected to from the tank side to the canister side (when the value detected by the pressure sensor 41 indicates a sufficient signal/noise ratio (S/N)). The ECU 51 also proceeds to step 1060 in the case that 1.5 seconds has elapsed since the switching (when the value detected by the pressure sensor 41 indicates a sufficient S/N) and the vehicle is in a stopped state, which indicates that the vehicle is not vibrating much.

At step 1060, the ECU 51 judges whether the conditional flag XZE is set at one. When the conditional flag XZE is set at zero indicating that the conditions for performing the testing of the three-way valve is unsatisfied, the ECU 51 proceeds to step 1080. If the conditional flag XZE is set at one indicating that the conditions for performing the test of the three-way valve 23 is satisfied, the ECU 51 proceeds to step 1070 and incrementally adds the value of the continuation time CPCT to the timer counter 56. Afterwards, the ECU 51 proceeds to step 1100.

The ECU 51 manipulates the value of the continuation time CPCT in the above manner. When the continuation time CPCT is incrementally added, the pressure sensor 41 switches the side to which it is connected from the tank side to the canister side.

In steps 1100 to 1120, the ECU 51 manipulates the completion flag XJE3.

At step 1100, the ECU 51 judges whether a purge initiating flag XJTH is set at one. When the initiating flag XJTH is set at zero indicating that the fuel purging has not yet been started, the ECU 51 proceeds to step 1200. If the initiating flag XJTH is set at one, indicating that the fuel purging has started, the ECU 51 proceeds to step 1110.

At step 1110, the ECU 51 judges whether the continuation time CPCT is equal to or longer than the upper limit of 1.5 seconds. When the continuation time CPCT is shorter than 1.5 seconds, the ECU 51 proceeds to step 1200. If the continuation time CPCT is equal to or longer than the upper limit of 1.5 seconds indicating that the testing of the three-way valve has been completed, the ECU 51 proceeds to step 1120 and sets the completion flag XJE3 to one. Afterwards, the ECU 51 proceeds to step 1200.

Figure 8:
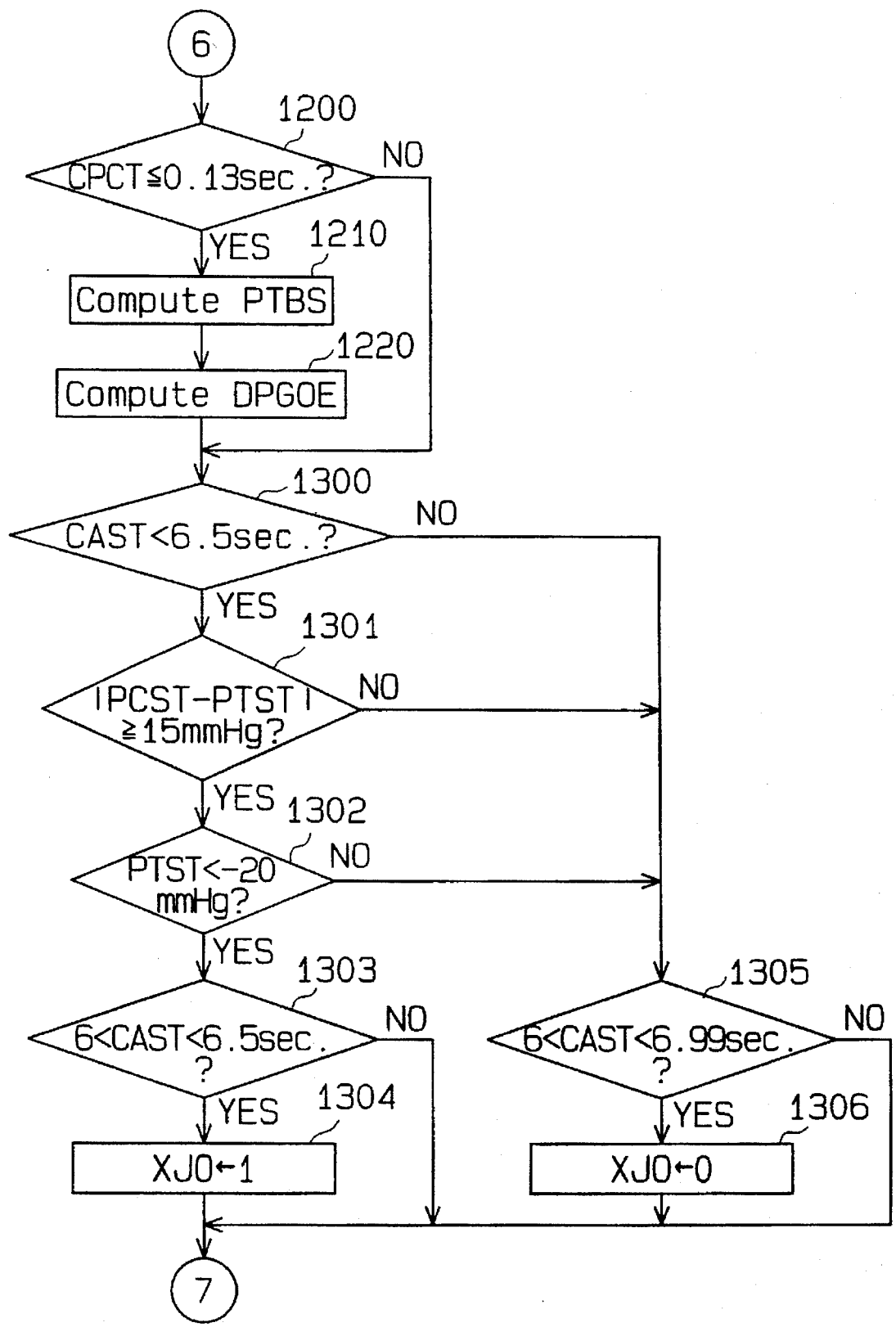
FIG. 8 is a flow chart continuing from FIG. 7.

As shown in FIG. 8, at step 1200, the ECU 51 judges whether the continuation time CPCT is equal to or shorter than 0.13 seconds. When the continuation time CPCT is longer than 0.13 seconds, this indicates that the pressure sensor 41 is connected to the canister side by the three-way valve 23. In this case, the ECU 51 proceeds to step 1300. If the continuation time CPCT is equal to or shorter than 0.13 seconds, the pressure sensor 41 is connected to the tank side by the three-way valve 23. In this case, the ECU 51 proceeds to step 1210 and computes the reference value PTBS of the tank pressure PT. The computed value is stored in the RAM 54. In this step, the smoothed value PTSM of the tank pressure PT is set as the reference value PTBS. At step 1220, the ECU 51 computes a reference value DPGOE, which is used to monitor a sudden change in the duty ratio DPG, and then proceeds to step 1300.

Figure 9:
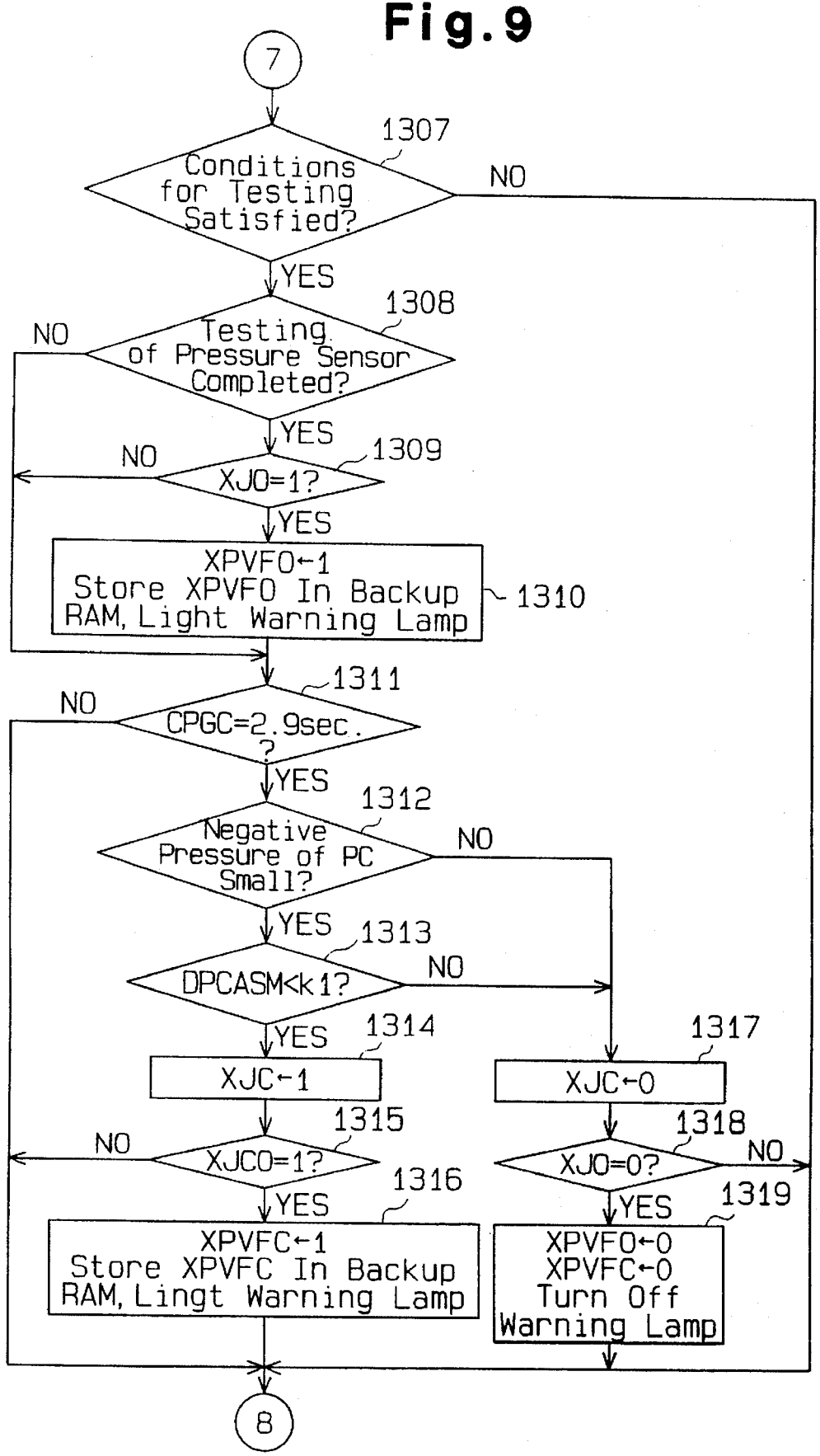
FIG. 9 is a flow chart continuing from FIG. 8.

As shown in FIGS. 8 and 9, the ECU 51 performs testing of the purge control valve 22 in steps 1300–1319.

At step 1300, the ECU 51 judges whether the running time CAST is shorter than 6.5 seconds. Although the value of 6.5 seconds is merely an example, it is presumed that this value is sufficient for causing negative intake pressure in the intake passage 10 after starting the engine 8. When the running time CAST is equal to or longer than 6.5 seconds, negative intake pressure is presumed to be produced in the intake passage 10. This indicates that fuel purging may be carried out. In this case, the ECU 51 proceeds to step 1305. If the running time CAST is shorter than 6.5 seconds, there is a possibility that there is no negative intake pressure produced in the intake passage 10. This indicates that fuel purging may not be carried out. In this case, the ECU 51 proceeds to step 1301.

At step 1301, the ECU 51 judges whether the absolute value of the difference between the canister pressure PCST after starting the engine 8 and the tank pressure PTST after starting the engine 8 is equal to or greater than 15 mmHG. The value of 15 mmHG is merely an example. Under the presumption that there is a malfunction in which the purge control valve 22 becomes fixed to a casing or the like with its valve body remaining in an opened state, the value detected by the pressure sensor 41 before completion of the engine starting would indicate atmospheric pressure. The value detected by the pressure sensor 41 after completion of the engine starting indicates a negative pressure. In this case, by determining whether the absolute value of the difference between the values PCST, PTST is greater than the reference value in step 1301, the ECU 51 determines that there is a difference between the pressure detected by the pressure sensor 41 before and after the completion of the engine starting. When the absolute value of the difference between the values PCST, PTST is smaller than 15 mmHg, the ECU 51 proceeds to step 1305. If the absolute value of the difference between the values PCST, PTST is equal to or greater than 15 mmHg, the ECU 51 proceeds to step 1302.

At step 1302, the ECU 51 determines whether the value of the tank pressure PTST (absolute value) is smaller than minus 20 mmHg, which corresponds to a negative pressure. In other words, if there is a malfunction in the purge control valve 22 that is related to its opening, negative pressure is detected by the pressure sensor 41 after completion of the starting of the engine 8. Thus, the ECU 51 determines the value of the tank pressure PTST when the engine is started in step 1302. When the tank pressure PTST is equal to or greater than minus 20 mmHg, the ECU 51 proceeds to step 1305. If the tank pressure PTST is smaller than minus 20 mmHg, the ECU 51 proceeds to step 1303.

At step 1303, the ECU 51 determines whether the running time CAST is within the range of 6 to 6.5 seconds. When the running time CAST is not within this range, the ECU 51 proceeds to step 1307. If the running time CAST is within this range, there is a possibility that there is a malfunction related to the opening of the purge control valve 22. Thus, the ECU 51 proceeds to step 1304 and sets a history flag XJO, which indicates history related to opening malfunctions, to one and stores the flag XJO in the RAM 54. The ECU 51 then proceeds to step 1307.

The ECU 51 proceeds to step 1305 from steps 1300 to 1302 and judges whether the running time CAST is within the range of 6 to 6.99 seconds. When the running time CAST is within this range, the ECU 51 proceeds to step 1306 and sets the history flag XJO to zero and stores the flag XJO in the RAM 54. The ECU 51 then proceeds to step 1307. If the running time is not within this range, the ECU 51 proceeds to step 1307.

As shown in FIG. 9, at step 1307, the ECU 51 judges whether the conditions required to perform testing of the purge control valve 22 are satisfied. The required conditions are that the condition flag XZE is set at one and the purge control valve 22 is determined to be free from opening malfunctions. When these conditions are not satisfied, the ECU 51 proceeds to step 1400. When these conditions are satisfied, the ECU 51 proceeds to step 1308.

At step 1308, the ECU 51 judges whether the testing of the pressure sensor 41 has been completed. The ECU 51 performs the testing of the pressure sensor in accordance with a separate routine. This step is executed by determining whether the running time CAST is equal to or longer than a predetermined value (e.g., 12 seconds). When the testing of the pressure sensor 41 has not been completed, the ECU 51 proceeds to step 1311. If the testing of the pressure sensor 41 has been completed, the ECU 51 proceeds to step 1309.

At step 1309, the ECU 51 judges whether the history flag XJO is set at one. When the history flag XJO is set at one indicating that the purge control valve 22 has a history of previous malfunctions, the ECU 51 proceeds to step 1310. At step 1310, the ECU 51 determines that the purge control valve 22 is definitely malfunctioning and sets a malfunction flag XPVFO to one. The ECU 51 stores the malfunction flag XPVFO in the backup RAM 55 as testing data. The ECU also lights the warning lamp 24 to warn the driver of the malfunction. The ECU 51 then proceeds to step 1311. If the history flag XJO is set at zero indicating that the purge control valve 22 does not have a history of malfunctions, the ECU 51 proceeds to step 1311.

In step 1310, the conditions for setting the malfunction flag XPVFO to one when determined that the purge control valve 22 is malfunctioning is as follows.

These conditions are the fuel purging not being performed, in which state the purge control valve 22 should be closed after the starting of the engine 8, the canister pressure PC being negative with respect to the predetermined reference value, and the value detected by the pressure sensor 41 after starting the engine 8 being negative with respect to the value detected by the sensor 41 before starting the engine 8.

At step 1311, the ECU 51 judges whether the elapsed time CPGC, timed from when the checking of the canister pressure PC is started, is 2.9 seconds. The value of 2.9 seconds is merely an example. This value is used as a target to indicate that fuel purging is definitely being performed. When the elapsed time CPGC is not 2.9 seconds, the ECU determines that fuel purging is not being performed and proceeds to step 1400. If the elapsed time CPGC is 2.9 seconds, the ECU 51 determines that fuel purging is being performed and proceeds to step 1312.

At step 1312, the ECU 51 judges whether the canister pressure PC is relatively small as a negative pressure. The ECU 51 carries out this judgement by determining whether the smoothed value PTSM is equal to or greater than a reference value of minus 13 mmHg. When the canister pressure PC is relatively small as a negative pressure, the ECU 51 proceeds to step 1313 and judges whether the canister side pulsation value DPCASM is lower than the predetermined reference value k1. In other words, the ECU 51 judges whether there is a pulsation in the canister pressure PC when the purge control valve 22 is operated in correspondence to the predetermined duty ratio DPG. When the pulsation value DPCASM is lower than the reference value k1, there is no pulsation in the canister pressure PC. Thus, the ECU 51 proceeds to step 1314. In step 1314, the ECU 51 determines that the purge control valve 22 is fixed to a casing or the like with its valve body in a closed state and is thus malfunctioning. To indicate the malfunction, the history flag XJC is set to one.

At step 1315, the ECU 51 judges whether the previous history flag XJCO is set at one. When the previous history flag XJCO is set at zero indicating that the history flag XJC has been set at one for the first time, the possibility of a malfunction is small. In this case, the ECU 51 proceeds to step 1400. If the previous history flag XJCO is set at one and the history flag XJC is again set at one, the possibility of a malfunction is high. In this case, the ECU 51 proceeds to step 1316 and determines that the purge control valve 22 is malfunctioning. To indicate the malfunction, the ECU 51 sets a malfunction flag XPVFC to one. The ECU 51 then stores the value of the malfunction flag XPVFC into the backup RAM 55 as malfunction data and lights the warning lamp 24 to warn the driver. Afterwards, the ECU 51 proceeds to step 1400.

The conditions for setting the malfunction flag XPVFC to one are the fuel purging being performed, in which state the purge control valve 22 should be opened, the canister pressure PC being positive with respect to the predetermined reference value, and the value detected by the pressure sensor 41 being free of pulsation. Satisfaction of these conditions are to be confirmed twice.

At step 1311, after the elapsed time CPGC is determined as 2.9 seconds, the moving vehicle being stopped results in the elapsed time CPGC being determined as 2.9 seconds again. Accordingly, the history flag XJC is set as one and then becomes reset as one when the vehicle is stopped. In step 1316, the malfunction flag XPVFC is set to one if the history flag XJC is set to one when the vehicle is stopped after the history flag XJC is set to one when the vehicle is moving.

If the negative pressure of the canister pressure PC is relatively great in step 1312, the ECU 51 proceeds to step 1317. If the pulsation value DPCASM is equal to or greater than the reference value k1 in step 1313, which indicates that there is a pulsation in the canister pressure PC, the ECU 51 proceeds to step 1317.

At step 1317, the ECU 51 clears the history flag XJC to zero. At step 1318, the ECU 51 judges whether the history flag XJO, which indicates malfunctioning of the purge control valve 22, is set at zero. When the history flag XJO is set at zero, the ECU 51 judges that the purge control valve 22 is functioning normally. Then, in step 1319, the ECU 51 sets each of the two malfunction flags XPVFO, XPVFC to zero and turns off the warning lamp 24. Afterwards, the ECU 51 proceeds to step 1400. The ECU 51 also proceeds to step 1400 when the history flag XJO is set at one, indicating that the purge control valve 22 is malfunctioning, in step 1319.

Figure 10:
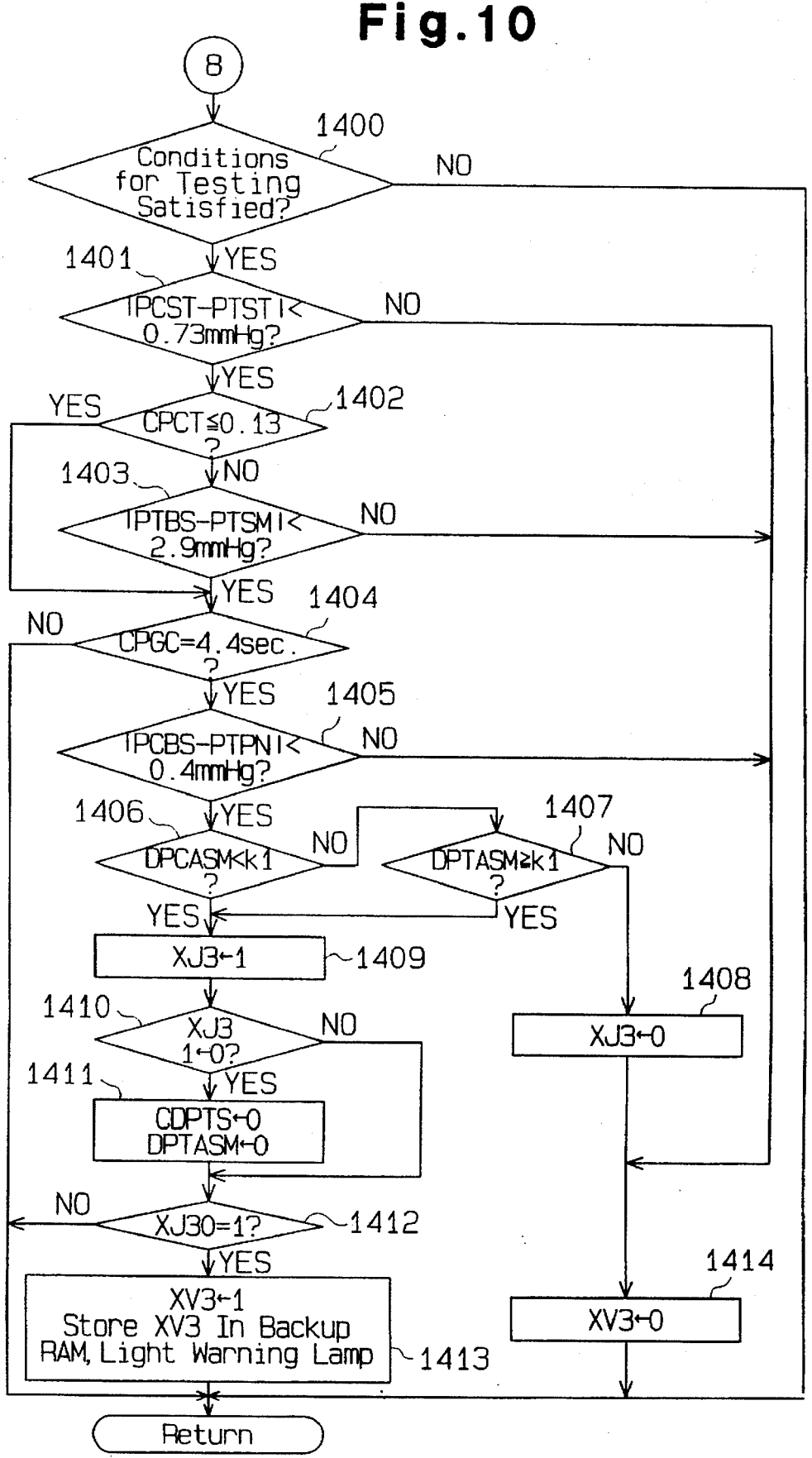
FIG. 10 is a flow chart continuing from FIG. 9.
Figure 11:
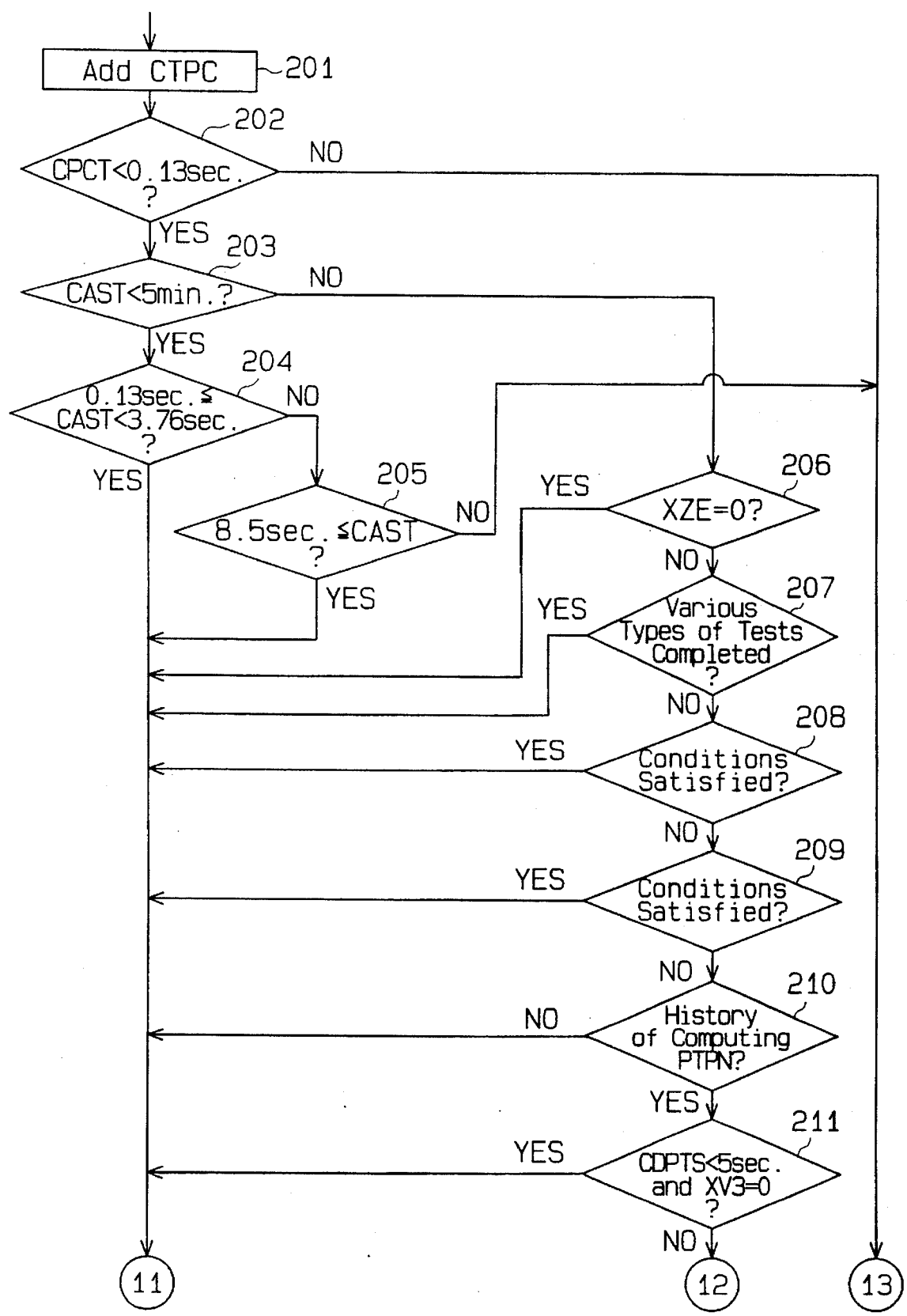
FIG. 11 is a flow chart illustrating a portion of the routine in FIG. 3 in detail.
Figure 12:
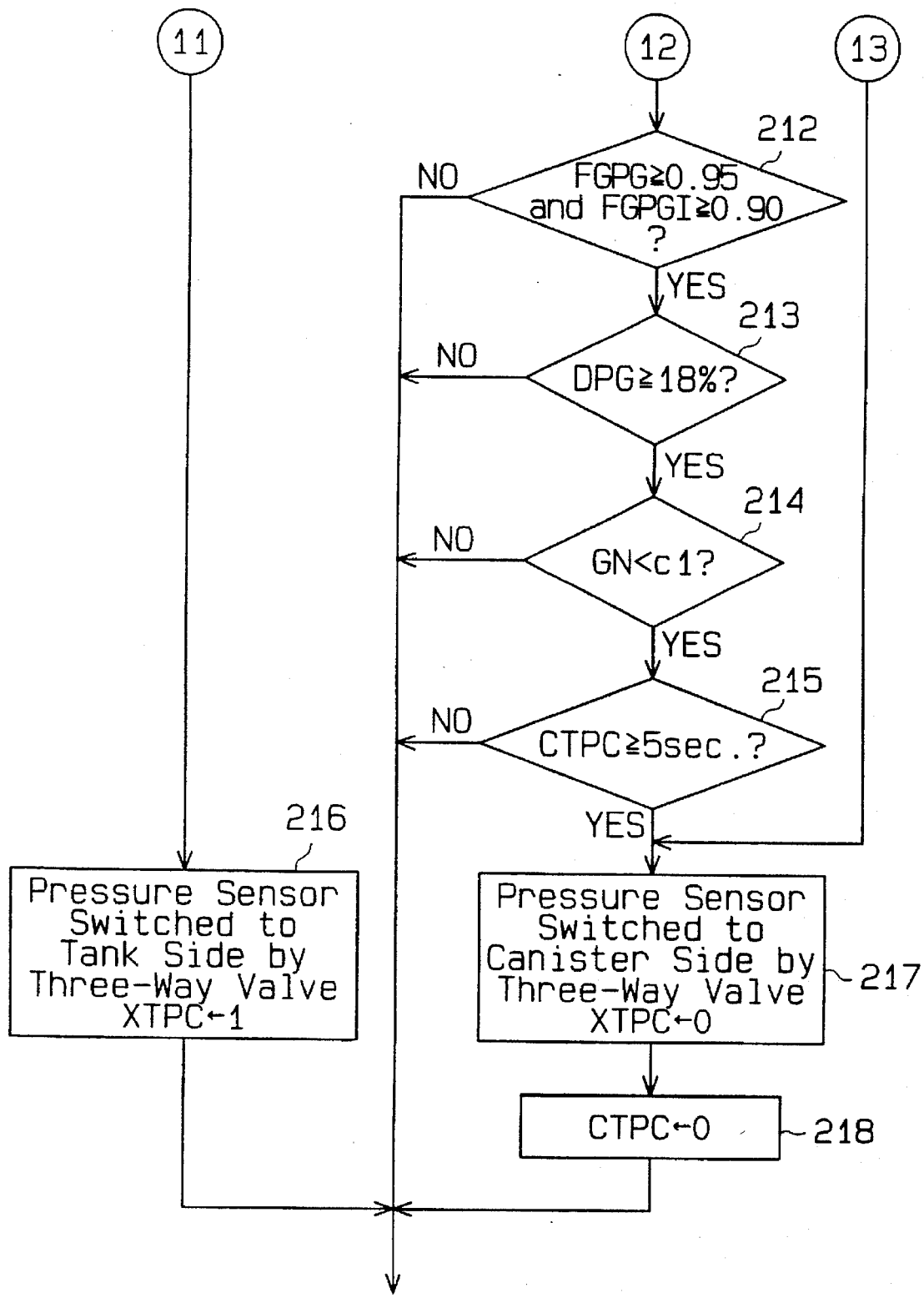
FIG. 12 is a flow chart continuing from FIG. 11.

As shown in FIG. 10, in steps 1400–1414, the ECU 51 performs testing of the three-way valve 23.

At step 1400, the ECU 51 judges whether the conditions for performing testing of the three-way valve 23 are satisfied. The conditions are the conditional flag XZE being set at one, the history flag XJ3 being set at zero, and the running time CAST being 11 seconds. The conditional flag XZE set at one indicates that the pressure sensor 41 is functioning normally. The running time CAST being 11 seconds indicates that the starting of the engine 8 has been completed. When these conditions are not satisfied, the ECU 51 determines that the testing of the three-way valve 23 shall not be performed and thus temporarily terminates subsequent processing. If these conditions are satisfied, the ECU 51 proceeds to step 1401 to perform testing of the three-way valve 23.

At step 1411, the ECU 51 judges whether the absolute value of the difference between the canister pressure PCST during the starting of the engine 8 and the tank pressure PTST during the starting of the engine 8 is lower than 0.73 mmHg. The value of 0.73 mmHg is: merely an example. It is presumed here that the three-way valve 23 malfunctions in a state that it becomes fixed to either the tank side or the canister side. In this state, although the pressure sensor 41 selectively detects the tank pressure PTST and the canister pressure PCST, the actual pressure detected is the value of either the tank pressure PTST or the canister pressure PCST. When the absolute value is smaller than 0.73 mmHg, or substantially equal to 0 mmHg, there is a possibility of the three-way valve 23 malfunctioning and the ECU 51 proceeds to step 1402. When the absolute value is equal to or greater than 0.73 mmHg, the ECU 51 determines that the three-way valve 23 is functioning properly and proceeds to step 1414. At step 1414, the ECU 51 sets the malfunction flag XV3 to zero to indicate that the three-way valve 23 is functioning properly and then temporarily terminates subsequent processing.

At step 1402, the ECU 51 judges whether the continuation time CPCT, which is timed from when the section detected by the pressure sensor 41 is switched from the tank side to the canister side, is equal to or shorter than 0.13 seconds. When the continuation time CPCT is equal to or shorter than 0.13 seconds, the ECJ 51 proceeds to step 1404. If the continuation time CPCT is longer than 0.13 seconds, the ECU 51 proceeds to step 1403 and judges whether the absolute value of the difference between the reference value PTBS of the tank pressure and the smoothed value PTSM of the tank pressure is lower than 2.9 mmHg. That is, the ECU 51 judges the difference between the values PTBS and PTSM immediately after the connected section of the pressure sensor 41 is changed from the tank side to the canister side. The value of 2.9 mmHg is merely an example. When the absolute value is equal to or greater than 2.9 mmHg, the ECU 51 determines that the three-way valve 23 functions properly since the difference between the values PTBS and PTSM is large. The ECU 51 then proceeds to step 1414. If the absolute value is lower than 2.9 mmHg, it is assumed that the three-way valve 23 is malfunctioning since the difference between the values PTBS and PTSM is small. The ECU 51 then proceeds to step 1404.

At step 1404, the ECU 51 judges whether the elapsed time CPGC, which is timed from when the checking of the canister pressure PC is started, is 4.4 seconds. The value of 4.4 seconds is merely an example. When the elapsed time CPGC is not equal to 4.4 seconds, the ECU 51 temporarily terminates subsequent processing. When the elapsed time CPGC is equal to 4.4 seconds, the ECU 51 proceeds to step 1405.

At step 1405, the ECU 51 judges whether the absolute value of the difference between the reference value PCBS of the canister pressure and the tank pressure PTPN during fuel purging is lower than 0.4 mmHg. The value of 0.4 mmHg is merely an example. When the absolute value is equal to or higher than 0.4 mmHg, this indicates that there is a pressure difference between the canister side and the tank side. In this case, the ECU 51 proceeds to step 1414. If the absolute value is lower than 0.4 mmHg, there is substantially no difference in the pressure of the canister side and the pressure of the tank side. In this case, the ECU 51 proceeds to step 1406.

At step 1406, the ECU 51 judges whether the canister side pulsation value DPCASM is lower than the reference value k1. That is, the ECU 51 judges whether there is no pulsation in the canister pressure PC. When the pulsation value DPCASM is lower than the reference value k1 indicating that there is no pulsation in the canister pressure PC, the ECU 51 proceeds to step 1409. At step 1409, the ECU 51 presumes that the three-way valve 23 is malfunctioning and sets the history flag XJ3, which indicates the history of the malfunction, to one. If the pulsation value DPCASM is equal to or greater than the reference value k1 indicating that there is a pulsation in the canister pressure PC, the ECU 51 proceeds to step 1407.

At step 1407, the ECU 51 judges whether the tank side pulsation value DPTASM is equal to or greater than the reference value k1. That is, the ECU 51 judges whether there is no pulsation in the tank pressure PT. When the pulsation value DPTASM is equal to or greater than the reference value k1 indicating that there is a pulsation in the tank pressure PT, the ECU 51 proceeds to step 1409. If the pulsation value DPTASM is lower than the reference value k1 indicating that there is a pulsation in the tank pressure PT, the ECU 51 proceeds to step 1408. In step 1408, the ECU 51 sets the history flag XJ3 to zero and then proceeds to step 1414.

As the ECU 51 proceeds to step 1410 from step 1409, the ECU 51 judges whether the history flag XJ3 has been changed to one from zero. If it has not been changed, the ECU 51 proceeds to step 1412. If the history flag XJ3 has been changed, the ECU 51 proceeds to step 1411 and clears the elapsed time CDPTS and the tank side pulsation value DPTASM to zero to recompute the pulsation value DPTASM. The ECU 51 recomputes the pulsation value DPTASM since there is a possibility that the vibrations produced by the moving vehicle may open the purge control valve 20 and cause the pressure sensor 41 to detect a value which differs from the target value. Thus, steps 1410, 1411 are carried out to avoid such problems.

At step 1412, the ECU 51 judges whether the previous history flag XJ30 is set at one. When the previous history flag XJ30 is set at zero indicating that the history flag XJ3 has been set to one for the first time, the possibility of malfunctions in the three-way valve 23 is small. Thus, the ECU 51 temporarily terminates subsequent processing. If the previous history flag XJ30 is set at one and the history flag XJ3 is again set at one, the ECU 51 proceeds to step 1413 and determines that the three-way valve 23 is malfunctioning. To indicate the malfunction, the ECU 51 sets the malfunction flag XV3 to one and stores this in the backup RAM 55 as testing data. The ECU 51 also lights the warning lamp 24 to warn the driver of the malfunction. The ECU 51 then temporarily terminates subsequent processing and waits to restart from step 100 when the next control cycle starts. The processing contents of the "first testing routine" has been described above.

The behavior of various parameters in the above routine will be described with reference to FIGS. 14(*a*) to 14(*m*) and the time chart shown in FIGS. 15(*a*) to 15(*j*).

Figure 14:
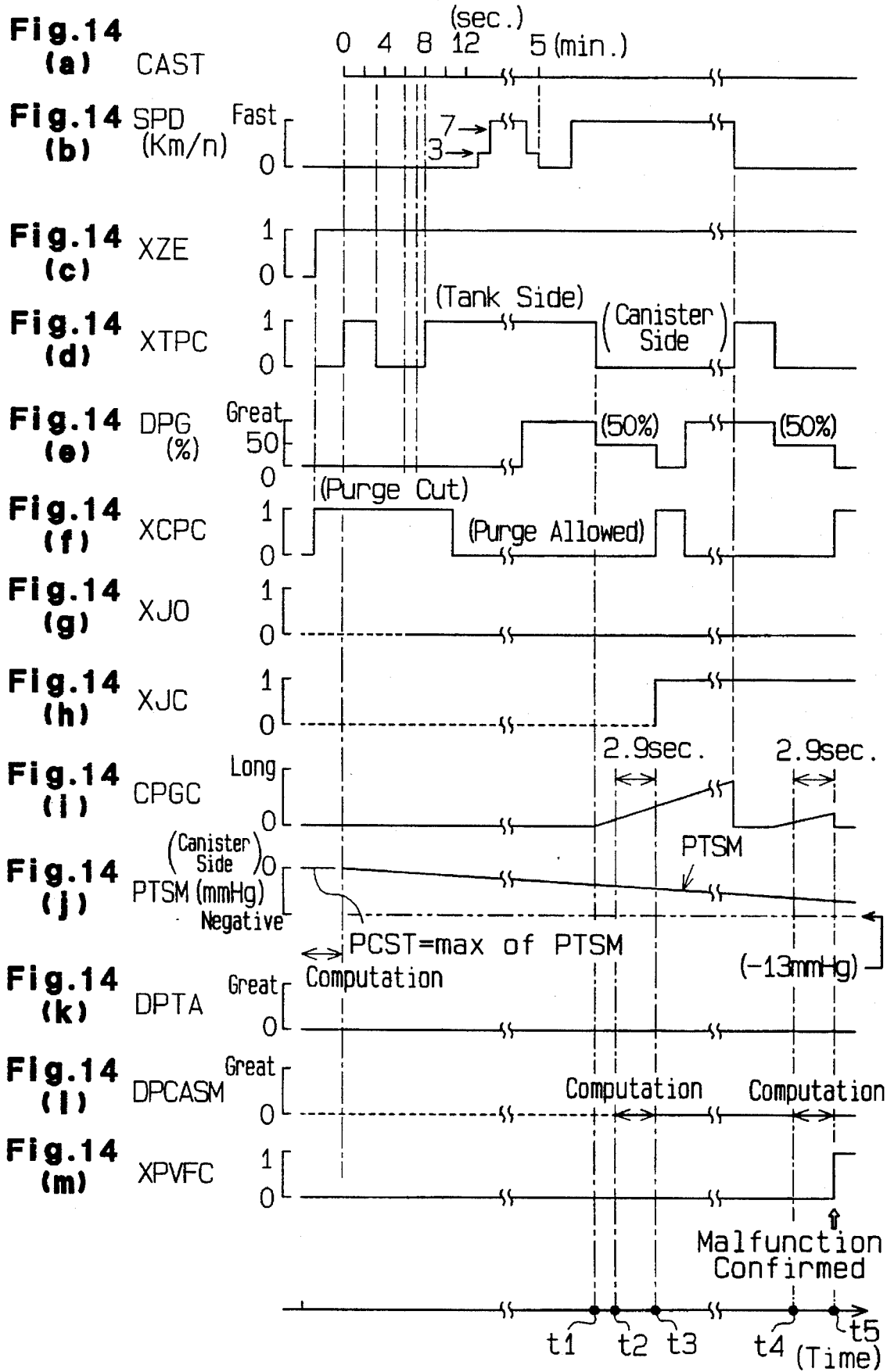
FIG. 14 (a) through FIG. 14 (m) are timing charts illustrating the timing of various parameters.
Figure 15:
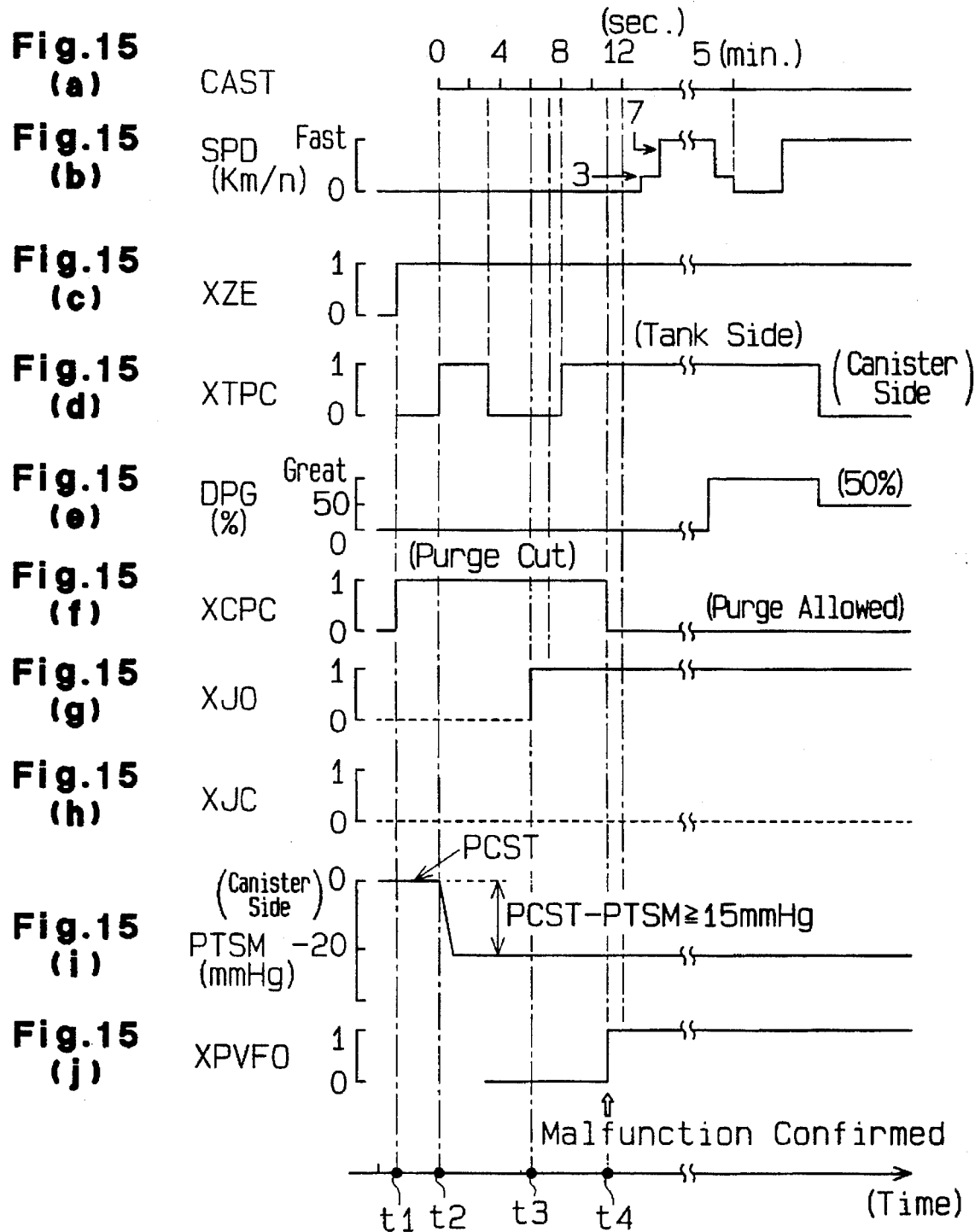
FIG. 15 (a) through FIG. 15 (j) are timing charts showing the timing of various parameters.

FIGS. 14(*a*) to 14(*m*) illustrate the behavior of various parameters when the purge control valve 22 malfunctions in a closed state. It is assumed here that there are no malfunctions in the processing apparatus except for the purge control valve 22. When the purge control valve 22 malfunctions in a closed state, the negative suction pressure produced in the intake pressure 10 is hindered from acting in the canister 14 through the purge line 21 regardless of the purge control valve 22 being controlled in correspondence to the required duty ratio DPG during the operation of the engine 8. Therefore, as shown in the drawings, the smoothed value PTSM, which indicates the behavior of the canister pressure PC, changes gradually in the negative direction as time elapses. The purge cut flag XCPC indicates whether fuel purging is performed.

At time t1, the condition required to perform testing (conditional flag XZE=1) is satisfied and the vehicle is in a moving state after having started the engine 8. In addition, the fuel purging execution conditions are satisfied (purge cut flag XCPC=0) and the duty ratio DPG becomes lower than 50%. The switching flag XTPC is changed to zero. The checking of the canister pressure PC is initiated and its elapsed time CPGC starts being timed.

Afterwards, between times t2 to t3 in which the elapsed time CPGC is in the range of one to three seconds, the canister side pulsation value DPCASM is computed. However, due to the purge control valve 22 being closed, the pulsation value DPCASM is equal to zero. During this period, the smoothed value PTSM becomes positive with respect to the reference value of minus 13 mmHg. In other words, under the condition that fuel purging is performed, in which state the purge control valve 22 should be opened, the canister pressure PC becomes positive with respect to the predetermined reference value and the value detected by the pressure sensor 41 becomes free of pulsation. Thus, the history flag XJC, which indicates the possibility of malfunctions of the valve 22 in a closed state, is set to one at time t3.

Between time t4 to t5, if the same results as above are obtained when the vehicle is not moving, it is confirmed that there is a malfunction at time t5 and the malfunction flag XPVFC is set to one. Since malfunctions are confirmed twice and are determined on the second time, the accuracy of the testing is high. In addition, malfunctions are confirmed when the vehicle is moving and reconfirmed when the vehicle is stopped. In cases where large vibrations are produced as the vehicle is driven along rough roads, the vibrations may accidentally open the vapor control valve 20 and cause the pressure inside the canister 14 to become equivalent to the atmospheric pressure. This may result in a temporary determination of malfunctions taking place. However, in the preferred embodiment, after the first test, malfunctions are reconfirmed when the vehicle is stopped. This allows testing of the purge control valve 22 to be performed under appropriate and stable conditions. Accordingly, the accuracy of the test is upgraded.

FIGS. 15(a) to 15(j) show the behavior of various parameters which are related to the malfunctions of the purge control valve 22 in a opened state. It is assumed here that there are no malfunctions in the processing apparatus except for the purge control valve 22. When the purge control valve 22 malfunctions in a opened state, the negative suction pressure produced in the intake pressure 10 is hindered from acting intermittently in the canister 14 through the purge line 21 regardless of the purge control valve 22 being controlled in correspondence to the required duty ratio DPG during the operation of the engine 8. In addition, intake pressure is produced after the engine 8 is started and not before. Therefore, as shown in the drawings, the smoothed value PTSM, which indicates the behavior of the canister pressure PC, varies greatly before and after the engine 8 is started.

During time t1 to t2, just before the starting of the engine 8, the condition required to perform testing (conditional flag XZE=1) is satisfied, the switching flag XTPC is set at one, and the canister pressure PC is checked. During this period, the canister pressure PCST during the starting of the engine 8 is computed. When the starting of the engine 8 is completed at time t2, the smoothed value PTSM, which indicates the behavior of the canister pressure PC, is reduced suddenly in the negative direction.

Afterwards, between times t2 to t3 in which the running time CAST is in the range of 0 to 6.5 seconds, the condition required to perform fuel purging remains unsatisfied (purge cut flag XCPC=1), the difference between the canister pressure PCST and the smoothed value PTSM becomes equal to or greater than 15 mmHg, and the smoothed value PTSM becomes lower than minus 20 mmHg. In other words, under the conditions that fuel purging is not performed after starting the engine 8, in which state the purge control valve 22 should be closed, the canister pressure PC becomes negative with respect to the predetermined reference value and the value detected by the pressure sensor 41 becomes negative with respect to the value detected before starting the engine 8. Thus, the history flag XJO, which indicates the possibility of malfunctions of the valve 22 in a opened state, is set at one at time t3.

Between times t3 to t4, the condition required for performing testing remains satisfied (conditional flag XZE=1) and the history flag XJO is set at one. If there is no previous history of malfunctions being confirmed and the testing of the pressure sensor 41 is completed, it is determined that there are malfunctions of the valve 22 in a opened state at time t4 and the malfunction flag XPVFO is set to one. In this manner, the testing of the purge control valve 22 is performed appropriately.

The warning lamp 24, which is provided in the passenger compartment near the driver's seat, is lit when malfunctions are confirmed in the purge control valve 22 and the three-way valve 23. This informs the driver of the malfunctions in the purge control valve 22 and the three-way valve 23. As a result, the warning enables the driver to cope with the malfunctions of the purge control valve 22 and the three-way valve 23 at an early stage.

When malfunctions are confirmed during the testing of the valves 22, 23, the values of each malfunction flag XPVFC, XPVFO, XV3 are stored in the backup RAM 55 as testing data. This enables the malfunction history of the valves 22, 23 to be confirmed during maintenance of the vehicle by reading out the testing data from the backup RAM 55.

Figure 16:
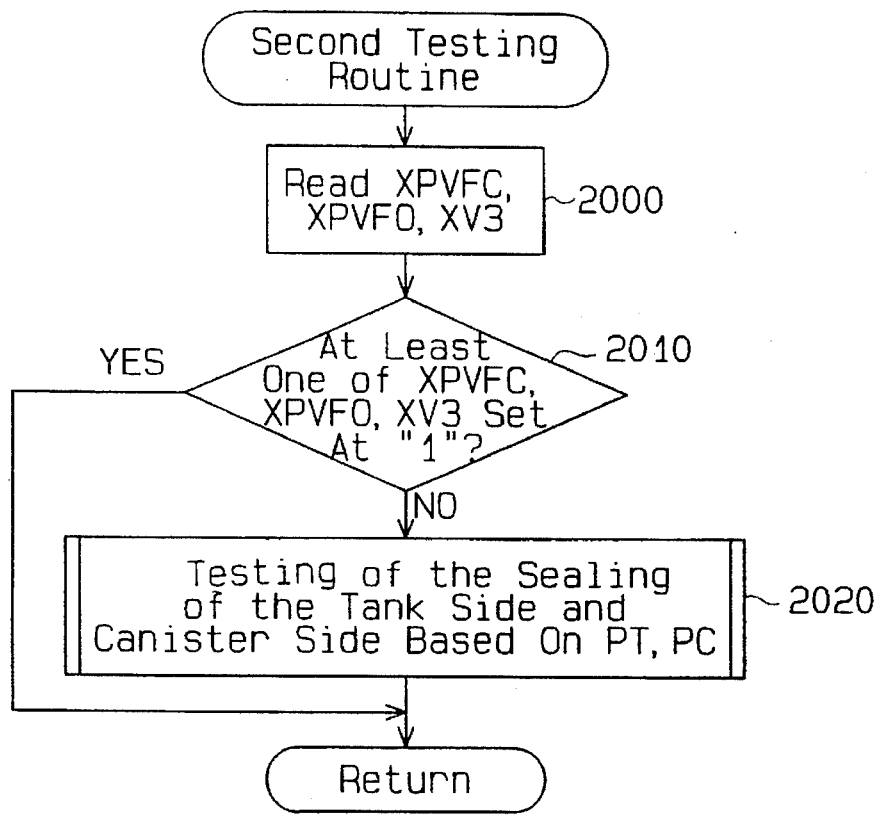
FIG. 16 is a flow chart showing a "second testing routine"
Figure 17:
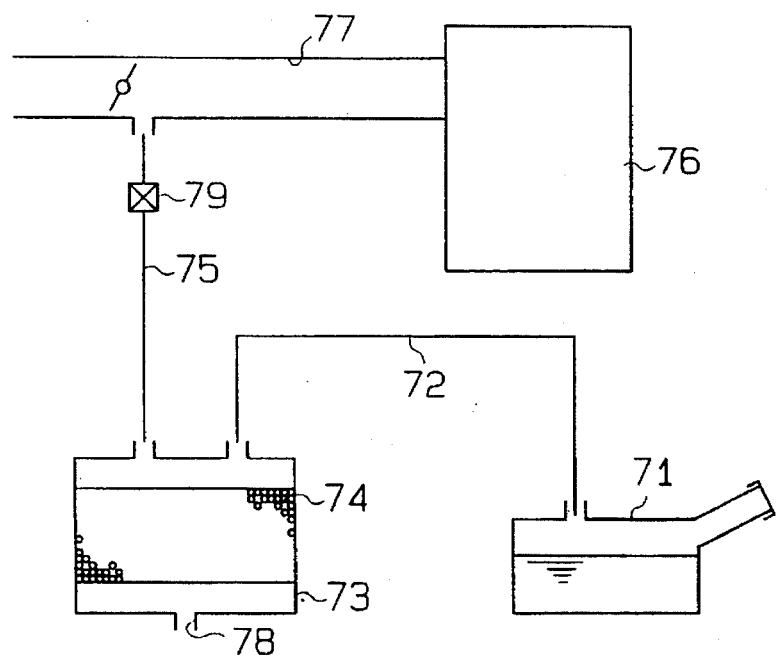
FIG. 17 is a schematic drawing showing the structure of a prior art fuel vapor treating device.
Figure 18:
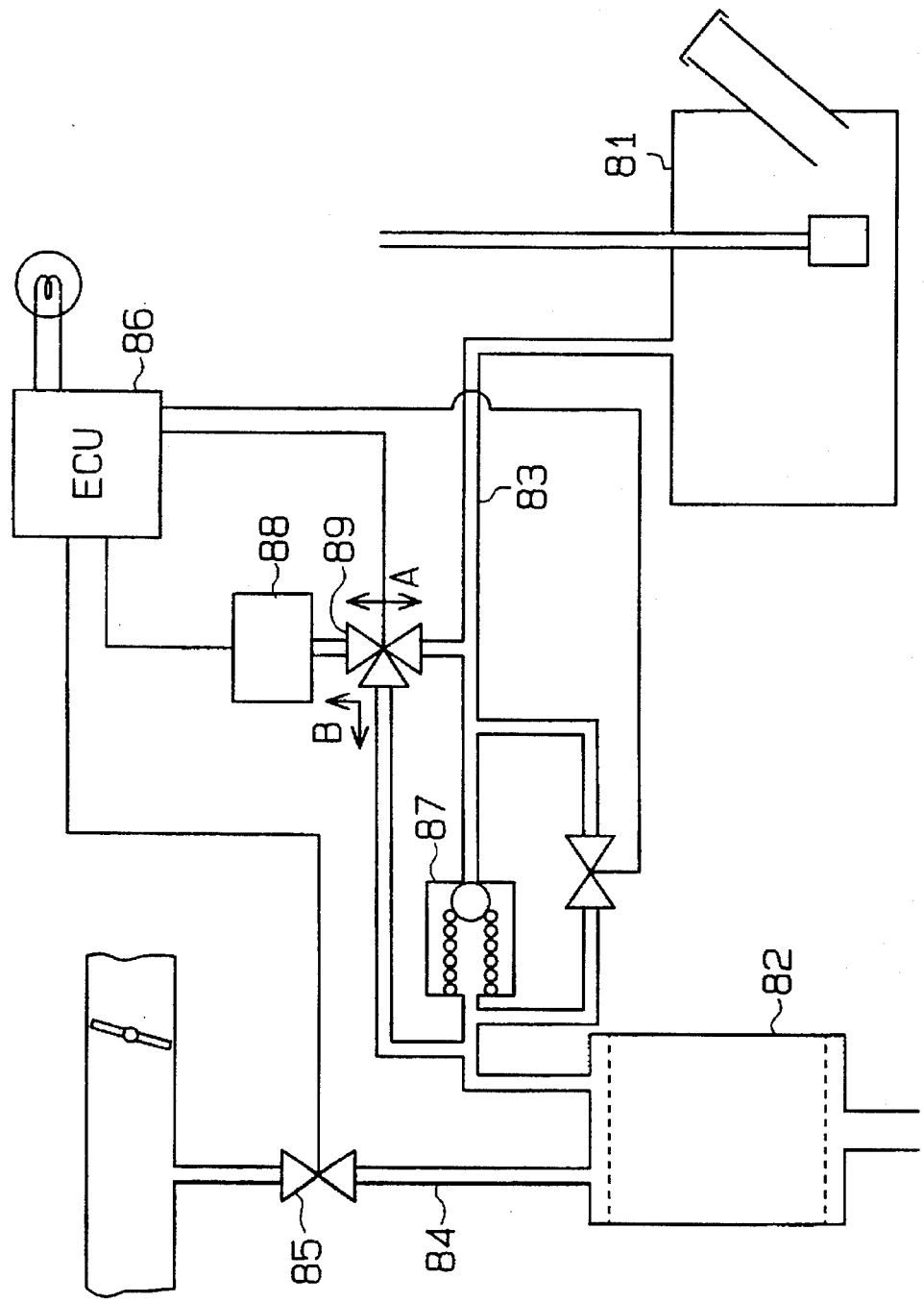
FIG. 18 is a schematic drawing showing the structure of a prior art testing apparatus for a fuel vapor treating device.

The results of the testing for the treating device, that is, the malfunction flags XPVFC, XPVFO related to the purge control valve 22 and the malfunction flag XV3 related to the three-way valve 23, will now be concisely described. A flow chart illustrating the "second testing routine", which is used to perform testing concerning the sealing of the treating device, is shown in FIG. 16. The ECU 51 executes this routine periodically for every predetermined time interval.

At step 2000, the ECU 51 reads the value of the malfunction flags XPVFC, XPVFO, XV3. At step 2010, the ECU 51 judges whether at least one of the malfunction flags XPVFC, XPVFO, XV3 is set at one. If all of the malfunction flags XPVFC, XPVFO, XV3 are set at zero, this indicates that both the purge control valve 22 and the three-way valve 23 are functioning normally. In this case, the ECU 51 proceeds to step 2020.

At step 2020, the ECU 51 performs testing of the sealing of the tank side and the canister side based on the value of the tank pressure PT and the canister pressure PC. Subsequent processing is then temporarily terminated. Specific description of the processing in step 2020 will not be given here.

If at least one of the malfunction flags XPVFC, XPVFO, XV3 is set at one in step 2010, this indicates that at least either the purge control valve 22 or the three-way valve 23 is malfunctioning. In this case, the ECU 51 prohibits the testing of the sealing at the tank side and the canister side from being performed.

The testing concerned with the sealing of the treating device is not performed when the purge control valve 22 malfunctions and thus may not be opened or closed, and when the three-way valve 23 malfunctions and thus may not be switched. The testing concerned with the sealing of the treating device is performed only when the valves 22, 23 are functioning normally. This prevents mistaken testing for malfunctions concerned with the sealing of the tank side and the pressure side. As a result, the reliability of the testing apparatus is upgraded. In other words, the present invention enables the treating device, which adjusts the flow rate of the fuel passing through the purge line 21, to appropriately perform testing of the sealing of the tank side and the canister side. Additionally, the purge control valve 22 and the three-way valve 23 is tested appropriately to perform the appropriate testing of the sealing of the tank side and the canister side.

Although only one embodiment of the present invention has been described herein, it should be apparent to those skilled in the art that the present invention may be embodied in many other specific forms without departing from the spirit or scope of the invention. Particularly, it should be understood that the present invention may be modified as described below.

The pressure sensor 41 detects the values of the tank pressure PT and the canister pressure PC by changing the section it is connected to using the three-way valve 23 for performing testing concerning the sealing of the tank side and the canister side. However, two pressure sensors may be used instead to separately detect the tank pressure PT and the canister pressure PC for performing testing concerning the sealing of the tank side and the canister side.

The present invention is embodied in a testing apparatus used to perform testing concerning the sealing of the tank side and the canister side. However, the present invention may be embodied in a testing apparatus used to perform testing concerning the sealing of only the canister side.

The canister 14 is provided with two atmospheric control valves 16, 18. However, the control valves 16, 18 may be omitted and a hole connected with the atmosphere may be provided instead.

Therefore, the present embodiment is to be considered as illustrative and not restrictive and the invention is not to be limited to the details given herein, but may be embodied within the scope of the appended claims.

What is claimed is:

1. A testing apparatus for a fuel vapor treating device, the treating device including a canister for collecting fuel vapor generated in a fuel tank through a vapor line, wherein the fuel in the tank is supplied to an engine, a purge line for purging the collected fuel in the canister into an air intake passage of the engine by a negative intake pressure generated in the intake passage during operation of the engine, a vapor control valve for adjusting a flow of the fuel vapor passing therethrough from the tank to the canister, wherein the vapor control valve opens in accordance with a difference between the pressure of the tank and the pressure of the canister, a purge control valve for adjusting a flow rate of fuel vapor passing through the purge line, wherein the opening of the purge control valve is duty controlled in accordance with a duty signal, and control means for controlling said purge control valve during operation of the engine, wherein the control means supplies the duty signal to the purge control valve, and wherein the duty control of the purge control valve causes pulsation of a negative intake pressure applied to the purge line from the air intake passage, the apparatus comprising:

pressure detecting means for detecting the pressure at a canister side of the vapor control valve;

first testing means for testing a malfunction related to a sealing of the canister side based on the detected pressure;

first deciding means for deciding whether said control means is supplying the duty signal to the purge control valve;

second deciding means for deciding whether the detected pressure is higher than a predetermined reference value;

third deciding means for deciding whether a pressure pulsation is absent in the detected pressure caused by the duty control of the purge control valve; and second testing means for determining that there is a malfunction hindering selective opening of the purge control valve, when the first deciding means decides that the control means is supplying the duty signal to the purge control valve and the second deciding means decides that the detected pressure is higher than a predetermined reference value and the third deciding means decides that the pressure pulsation is absent in the detected pressure caused by the duty control of the purge control valve.

2. The apparatus as set forth in claim 1, wherein said first deciding means further decides whether the engine starting has been completed and whether the duty signal corresponds to a predetermined duty ratio to decide whether the control means is supplying the duty signal to the purge control valve.

3. The apparatus as set forth in claim 2, wherein said third deciding means computes the pressure pulsation by adding incrementally, to a previously determined pulsation value, an absolute value of a difference between the detected pressure and an average of the detected pressure.

4. The apparatus as set forth in claim 3, wherein said third deciding means sets the absolute value as zero when the absolute value is smaller than a predetermined value.

5. The apparatus as set forth in claim 3, wherein said first testing means judges a malfunction related to the sealing of the canister side when the detected value of the pressure at the canister side differs from a predetermined value corresponding to the running condition of the engine.

6. The apparatus as set forth in claim 5, wherein said pressure detecting means includes a pressure sensor for detecting the interior pressure at the canister side and at the tank side, and a three-way valve having a first port, a second port and a third port, said first port being connected to the pressure sensor, said second port being connected to the canister at the side of the vapor control valve, and said third port being connected to the vapor line at the side of the vapor control valve, wherein said first and second ports are connected with each other by switching the three-way valve for detecting the interior pressure at the canister side, and wherein said first and third ports are connected with each other by switching the three-way valve for detecting the interior pressure at the tank side.

7. The apparatus as set forth in claim 6, wherein said second testing means performs testing when the engine is idling.

8. The apparatus as set forth in claim 1, wherein said first testing means, said second testing means, said first deciding means, said second deciding means and said third deciding means incorporate an electronic control unit having an input signal processor, a memory, an operation circuit and an output signal processor.

9. The apparatus as set forth in claim 1 further comprising prohibiting means for prohibiting the first testing means from testing when a malfunction of the purge control valve is found by the second testing means.

10. The apparatus as set forth in claim 1 further comprising warning means for warning of a malfunction of the purge control valve when a malfunction is found by the second testing means.

11. A testing apparatus for a fuel vapor treating device, the treating device including a canister for collecting fuel vapor generated in a fuel tank through a vapor line, wherein the fuel in the tank is supplied to an engine, a purge line for purging the collected fuel in the canister into an air intake passage of the engine by a negative intake pressure generated in the intake passage during operation of the engine, a vapor control valve for adjusting a flow of the fuel vapor passing therethrough from the tank to the canister, wherein the vapor control valve opens in accordance with a difference between the pressure of the tank and the pressure of the canister, a purge control valve for adjusting a flow rate of fuel vapor passing through the purge line, wherein the opening of the purge control valve is duty controlled in accordance with a duty signal, and control means for controlling said purge control valve during operation of the engine, wherein the control means supplies the duty signal to the purge control valve, and wherein the duty control of the purge control valve causes pulsation of a negative intake pressure applied to the purge line from the air intake passage, the apparatus comprising:

pressure detecting means for detecting the pressure at a canister side of the vapor control valve;

first testing means for testing a malfunction related to a sealing of the canister side based on the detected pressure;

first deciding means for deciding whether said control means terminates supplying the duty signal to the purge control valve after completion of the engine starting;

second deciding means for deciding whether the detected pressure is lower than a predetermined reference value after a completion of the engine starting;

third deciding means for deciding whether the pressure detected after completion of the engine starting is lower than the pressure detected before completion of the engine starting; and second testing means for determining that there is a malfunction hindering selective closing of the purge control valve, when the first deciding means decides that the control means terminates supplying the duty signal to the purge control valve after completion of the engine starting and the second deciding means decides that the detected pressure is lower than a predetermined reference value after a completion of the engine starting and the third deciding means decides that the pressure detected after completion of the engine starting is lower than the pressure detected before completion of the engine starting.

12. The apparatus as set forth in claim 11, wherein said first testing means judges a malfunction related to the sealing of the canister side when the detected value of the pressure at the canister side differs from a predetermined value corresponding to the running condition of the engine.

13. The apparatus as set forth in claim 12, wherein said pressure detecting means includes a pressure sensor for detecting the interior pressure at the canister side and at the tank side, and a three-way valve having a first port, a second port and a third port, said first port being connected to the pressure sensor, said second port being connected to the canister at the side of the vapor control valve, and said third port being connected to the vapor line at the side of the vapor control valve, wherein said first and second ports are connected with each other by switching the three-way valve for detecting the interior pressure at the canister side, and wherein said first and third ports are connected with each other by switching the three-way valve for detecting the interior pressure at the tank side.

14. The apparatus as set forth in claim 11 further comprising prohibiting means for prohibiting the first testing means from testing when a malfunction of the purge control valve is found by the second testing means.

15. The apparatus as set forth in claim 11 further comprising warning means for warning of a malfunction of the purge control valve when a malfunction is found by the second testing means.

16. The apparatus as set forth in claim 11, wherein said first testing means, said second testing means, said first deciding means, said second deciding means and said third deciding means incorporate an electronic control unit having an input signal processor, a memory, an operation circuit and an output signal processor.

17. A testing apparatus for a fuel vapor treating device, the treating device including a canister for collecting fuel vapor generated in a fuel tank through a vapor line, wherein the fuel in the tank is supplied to an engine, a purge line for purging the collected fuel in the canister into an air intake passage of the engine by a negative intake pressure generated in the intake passage during operation of the engine, a vapor control valve for adjusting a flow of the fuel vapor passing therethrough from the tank to the canister, wherein the vapor control valve opens in accordance with a difference between the pressure of the tank and the pressure of the canister, a purge control valve for adjusting a flow rate of fuel vapor passing through the purge line, wherein the opening of the purge control valve is duty controlled in accordance with a duty signal, and control means for controlling said purge control valve during operation of the engine, wherein the control means supplies the duty signal to the purge control valve, and wherein the duty control of the purge control valve causes pulsation of a negative intake pressure applied to the purge line from the air intake passage, the apparatus comprising:

pressure detecting means for detecting the pressure at a canister side of the vapor control valve;

first testing means for testing a malfunction related to a sealing of the canister side based on the detected pressure;

first deciding means for deciding whether said control means is supplying the duty signal to the purge control valve;

second deciding means for deciding whether the detected pressure is higher than a predetermined reference value;

third deciding means for deciding whether a pressure pulsation is absent in the detected pressure caused by the duty control of the purge control valve;

second testing means for determining that there is a malfunction hindering selective opening of the purge control valve, when the first deciding means decides that the control means is supplying the duty signal to the purge control valve and the second deciding means decides that the detected pressure is higher than a predetermined reference value and the third deciding means decides that the pressure pulsation is absent in the detected pressure caused by the duty control of the purge control valve;

fourth deciding means for deciding whether said control means terminates supplying the duty signal to the purge control valve after completion of the engine starting;

fifth deciding means for deciding whether the detected pressure is lower than a predetermined reference value after a completion of the engine starting;

sixth deciding means for deciding whether the pressure detected after completion of the engine starting is lower than the pressure detected before completion of the engine starting; and third testing means for determining that there is a malfunction hindering selective closing of the purge control valve, when the fourth deciding means decides that the control means terminates supplying the duty signal to the purge control valve after completion of the engine starting and the fifth deciding means decides that the detected pressure is lower than a predetermined reference value after a completion of the engine starting and the sixth deciding means decides that the pressure detected after completion of the engine starting is lower than the pressure detected before completion of the engine starting.

18. The apparatus as set forth in claim 17 further comprising prohibiting means for prohibiting the first testing means from testing when a malfunction of the purge control valve is found by at least one of the second testing means and the third testing means.

19. The apparatus as set forth in claim 17 further comprising warning means for warning of a malfunction of the purge control valve when a malfunction is found by at least one of the second testing means and the third testing means.

* * * * *

UNITED STATES PATENT AND TRADEMARK OFFICE
CERTIFICATE OF CORRECTION

PATENT NO. : 5,629,477

DATED : 13 May 1997

INVENTOR(S) : Tokiji ITO

It is certified that error appears in the above-identified patent and that said Letters Patent is hereby corrected as shown below:

| Column | Line | |
|--------|------|---|
| 21 | 12 | Change "1411" to --1401--. |
| 21 | 16 | Change "is:" to --is--. |

Signed and Sealed this

Third Day of February, 1998

Attest:

Attesting Officer

BRUCE LEHMAN

Commissioner of Patents and Trademarks